United States Patent
Straw et al.

(10) Patent No.: US 9,989,014 B2
(45) Date of Patent: Jun. 5, 2018

(54) PREMIXED LIQUID PROPELLANT PROPULSION SYSTEM AND METHOD WITH ANTI-FLASHBACK QUENCHING LIQUID INJECTOR

(71) Applicant: The Boeing Company, Chicago, IL (US)

(72) Inventors: Anthony D. Straw, Aliso Viejo, CA (US); Mark J. Holthaus, Long Beach, CA (US); Steven J. Hoeser, Burke, VA (US)

(73) Assignee: The Boeing Company, Chicago, IL (US)

( * ) Notice: Subject to any disclaimer, the term of this patent is extended or adjusted under 35 U.S.C. 154(b) by 1118 days.

(21) Appl. No.: 14/229,823

(22) Filed: Mar. 28, 2014

(65) Prior Publication Data

US 2016/0160801 A1    Jun. 9, 2016

(51) Int. Cl.
*F02K 9/50* (2006.01)
*F02K 9/52* (2006.01)
*F02K 9/42* (2006.01)

(52) U.S. Cl.
CPC ............ *F02K 9/50* (2013.01); *F02K 9/52* (2013.01); *F02K 9/42* (2013.01)

(58) Field of Classification Search
CPC ..... F02K 9/42; F02K 9/50; F02K 9/52; F02K 9/94

See application file for complete search history.

(56) References Cited

U.S. PATENT DOCUMENTS

| | | | | |
|---|---|---|---|---|
| 3,001,365 A | * | 9/1961 | Kellogg | F02K 9/52 60/258 |
| 3,102,388 A | * | 9/1963 | Abild | F02K 9/50 60/224 |
| 3,779,009 A | * | 12/1973 | Friedman | C06D 5/04 149/1 |
| 4,804,520 A | * | 2/1989 | Richtenburg | F42B 10/64 165/132 |
| 5,282,357 A | * | 2/1994 | Sackheim | B64G 1/401 60/204 |
| 5,804,760 A | * | 9/1998 | Flynn | C06B 47/02 149/1 |
| 6,193,187 B1 | | 2/2001 | Scott et al. | |
| 6,755,359 B2 | | 6/2004 | Sprouse et al. | |

(Continued)

*Primary Examiner* — Lorne Meade

(57) ABSTRACT

A liquid injector system for a combustion engine, having a single feed inlet configured to receive a premixed liquid propellant under pressure or a purge gas under pressure, and having a liquid injector assembly. The assembly has a liquid injector having a hollow dome and injector holes configured to receive and inject the premixed liquid propellant or the purge gas through the liquid injector and into a combustion chamber. The liquid injector system has a liquid-to-gas zone between an injector outlet side and a flame front. A pressure gradient decrease between the liquid injector and the combustion chamber causes the premixed liquid propellant to expand from liquid to gas phases, which causes a temperature decrease at the liquid-to-gas zone, wherein the pressure gradient decrease and the temperature decrease prevent or mitigate the flame front from propagating upstream of the combustion chamber, which achieves an anti-flashback quenching liquid injector design.

23 Claims, 10 Drawing Sheets

(56) References Cited

U.S. PATENT DOCUMENTS

| | | | |
|---|---|---|---|
| 6,779,335 B2* | 8/2004 | Herdy, Jr. | C06B 47/04 60/205 |
| 6,857,274 B2 | 2/2005 | Sprouse et al. | |
| 6,918,243 B2 | 7/2005 | Fisher | |
| 8,230,672 B2 | 7/2012 | Mungas et al. | |
| 8,230,673 B2* | 7/2012 | Mungas | F02K 9/52 60/257 |
| 8,572,946 B2* | 11/2013 | Mungas | F02K 9/52 60/204 |
| 2009/0133788 A1* | 5/2009 | Mungas | C06B 47/04 149/74 |
| 2010/0275577 A1 | 11/2010 | Mungas et al. | |

\* cited by examiner

PREMIXED LIQUID PROPELLANT PROPULSION SYSTEM AND METHOD WITH ANTI-FLASHBACK QUENCHING LIQUID INJECTOR

BACKGROUND

1) Field of the Disclosure

The disclosure relates generally to systems and methods for injecting fluids, and more specifically, to a liquid injector and associated propulsion system and method for injecting a premixed liquid propellant into a combustion chamber of a combustion engine, such as a rocket combustion engine.

2) Description of Related Art

Propulsion systems of air vehicles with rocket combustion engines, such as launch vehicles with liquid propellant rocket engines, may typically use single fluid injectors to inject and supply a fuel and an oxidizer into the combustion chambers of the engines. Mixing of the fuel and oxidizer occurs within the combustion chamber.

One known propulsion system separates the fuel and the oxidizer into two separate tanks and feed systems, such as liquid oxygen and liquid hydrogen, and mixes them in the combustion chamber just prior to ignition. However, such a separated propulsion system may suffer from the structural design weight penalty of having multiple tanks and feed systems. This may lower the mass fraction (propellant to total system weight) of such design.

Another know propulsion system may use a single molecule or a monopropellant, such as hydrazine, stored in one tank. Monopropellants are chemically structured such that if they are run through a catalyst bed, the monopropellant molecules dissociate. In so doing, they release their atomic bonding energy and produce heat. This provides the expansion pressures for thrust. Hydrazine (mono-methyl-hydrazine) has properties that allow it to act as both a monopropellant and as a fuel when combined with nitrogen tetroxide oxidizer (MMH/NTO). However, the use of monopropellants may be expensive and may require costly special suites and handling equipment.

Another known propulsion system may use a gaseous nitrous oxide fuel blend engine (e.g., premixed gas nitrous oxide/ethylene ($N_2O/C_2H_4$)), with a micro-fluidic porous media element for anti-flashback. However, the premixed gas nitrous oxide/ethylene utilizing micro-fluidic porous media elements may restrict mass flow, as such micro-fluidic porous media elements use holes of fifty (50) microns and smaller to prevent flashback and do not offer the desired flow rate of fuel and oxidizer into the ignition combustion chamber. In addition, tuning this system has proven problematic and may introduce a limit to the propulsion thrust class.

Accordingly, an improved propulsion system and method for combustion engines, such as rocket combustion engines, is needed that provide advantages over known systems and methods.

SUMMARY

This need for an improved propulsion system and method for combustion engines, such as rocket combustion engines, is satisfied. As discussed in the below detailed description, embodiments of such improved propulsion system and method for combustion engines, such as rocket combustion engines, may provide significant advantages over existing systems and methods.

In one embodiment there is provided a liquid injector system for a combustion engine. The liquid injector system comprises a single feed inlet configured to receive a premixed liquid propellant under pressure or a purge gas under pressure. The liquid injector system further comprises a liquid injector assembly coupled to the single feed inlet.

The liquid injector assembly comprises a liquid injector having one or more injector holes configured to receive and inject the premixed liquid propellant or the purge gas through the liquid injector and into the combustion chamber coupled to the liquid injector. The liquid injector assembly further comprises a hollow dome coupled to the single feed inlet and coupled over an injector inlet side of the liquid injector.

The liquid injector system further comprises a liquid-to-gas zone between an injector outlet side of the liquid injector and a flame front in the combustion chamber of a combustion engine. A pressure gradient decrease between the liquid injector and the combustion chamber causes the premixed liquid propellant to expand from a liquid phase into a gas phase, which causes a temperature decrease at the liquid-to-gas zone, wherein the pressure gradient decrease and the temperature decrease prevent or mitigate the flame front from propagating upstream of the combustion chamber, which achieves an anti-flashback quenching liquid injector design.

In another embodiment there is provided a premixed liquid propellant propulsion system. The premixed liquid propellant propulsion system comprises a combustion engine comprising a liquid injector system coupled to a combustion chamber.

The liquid injector system comprises a single feed inlet configured to receive a premixed liquid propellant under pressure or a purge gas under pressure, wherein the premixed liquid propellant comprises a mixture of one or more fuels and an oxidizer, and further wherein the purge gas comprises an inert gas. The liquid injector system further comprises a liquid injector assembly coupled to the single feed inlet.

The liquid injector assembly comprises a liquid injector having one or more injector holes configured to receive and inject the premixed liquid propellant or the purge gas through the liquid injector and into the combustion chamber coupled to the liquid injector. The liquid injector assembly further comprises a hollow dome coupled to the single feed inlet and coupled over an injector inlet side of the liquid injector.

The liquid injector system further comprises a liquid-to-gas zone between an injector outlet side of the liquid injector and a flame front in the combustion chamber. A pressure gradient decrease between the liquid injector and the combustion chamber causes the premixed liquid propellant to expand from a liquid phase into a gas phase, which causes a temperature decrease at the liquid-to-gas zone, wherein the pressure gradient decrease and the temperature decrease prevent or mitigate the flame front from propagating upstream of the combustion chamber, which achieves an anti-flashback quenching liquid injector design.

The premixed liquid propellant propulsion system further comprises a premixed liquid propellant assembly coupled to the single feed inlet of the liquid injector system, the premixed liquid propellant assembly supplying the premixed liquid propellant under pressure to the liquid injector system. The premixed liquid propellant propulsion system further comprises a purge gas assembly coupled to the single feed inlet of the liquid injector system, the purge gas assembly supplying the purge gas under pressure to the liquid injector system.

In another embodiment there is provided a method of operating a premixed liquid propellant propulsion system. The method comprises the step of coupling a premixed liquid propellant assembly to a liquid injector system of the premixed liquid propellant propulsion system. The premixed liquid propellant assembly is configured to supply a premixed liquid propellant under pressure to the liquid injector system.

The method further comprises the step of coupling a purge gas assembly to the liquid injector system. The purge gas assembly is configured to supply a purge gas under pressure to the liquid injector system.

The method further comprises the step of injecting only the purge gas into a liquid injector of the liquid injector system via a single feed inlet, and injecting the purge gas through one or more injector holes of the liquid injector and into a combustion chamber coupled to the liquid injector. The method further comprises the step of injecting only the premixed liquid propellant into the liquid injector via the single feed inlet, and injecting the premixed liquid propellant through the one or more injector holes and into the combustion chamber.

The method further comprises the step of creating a pressure gradient decrease between the liquid injector and the combustion chamber, and expanding the premixed liquid propellant from a liquid phase into a gas phase at a liquid-to-gas zone between an injector outlet side of the liquid injector and a flame front in the combustion chamber, resulting in a temperature decrease at the liquid-to-gas zone, wherein the pressure gradient decrease and the temperature decrease prevent or mitigate the flame front from propagating upstream of the combustion chamber. The method further comprises the step of igniting and burning the premixed liquid propellant in the gas phase.

The method further comprises the step of ceasing injection of the premixed liquid propellant into the liquid injector. The method further comprises the step of repeating the step of injecting only the purge gas into the liquid injector, and removing any premixed liquid propellant upstream of the liquid injector.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1A:
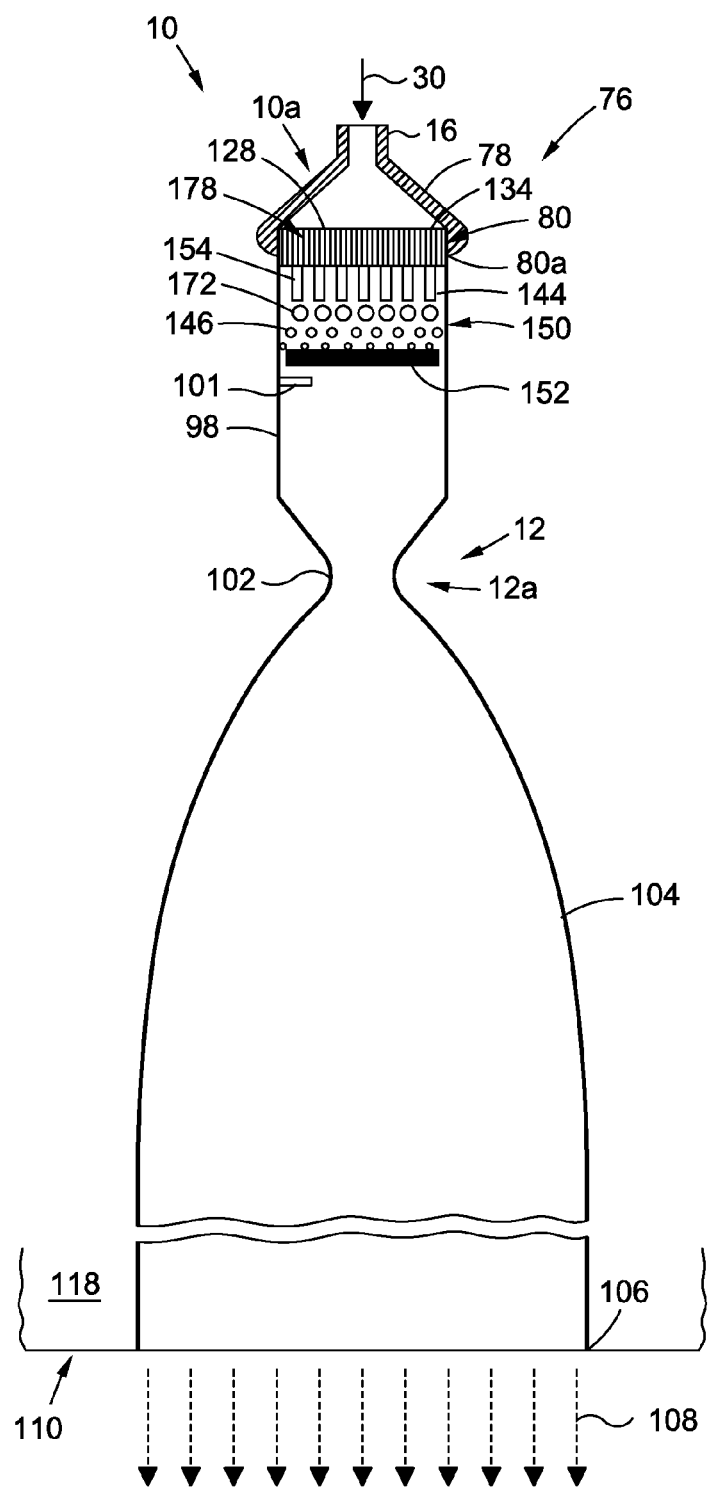
FIG. 1A is an illustration of a sectional view of an embodiment of a liquid injector system in a combustion engine of a rocket.

Now referring to the Figures, FIG. 1A is an illustration of a sectional view of an embodiment of a liquid injector system 10, such as in the form of a rocket liquid injector system 10a, in a combustion engine 12, such as in the form of a rocket combustion engine 12a. As shown in FIG. 1A, the liquid injection system 10, such as in the form of rocket liquid injector system 10a, is housed within a structure 110, such as in the form of a rocket 118.

Figure 1B:
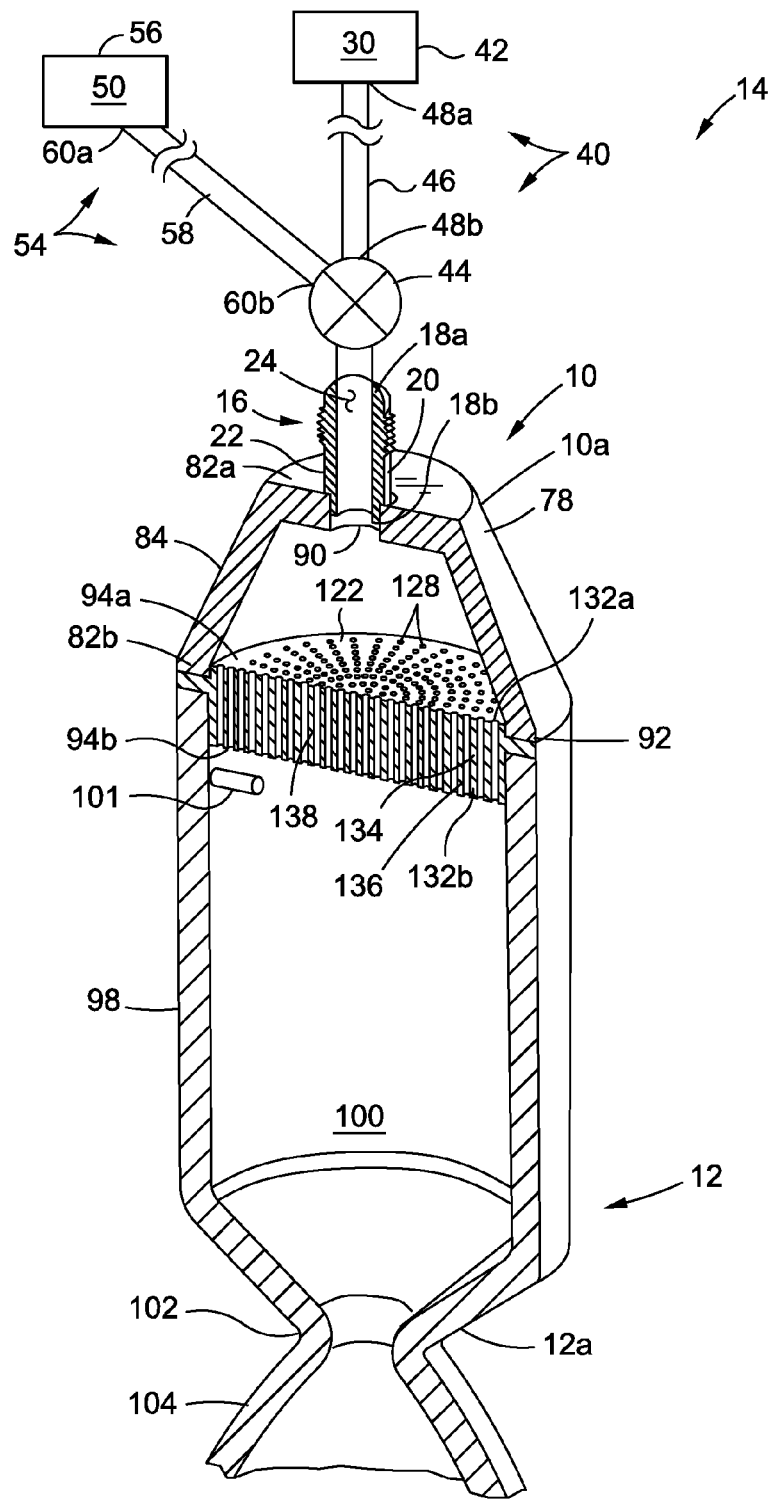
FIG. 1B is an illustration of a sectional view of an embodiment of a premixed liquid propellant propulsion system with an embodiment of a liquid injector system in a combustion engine of the disclosure.
Figure 1C:
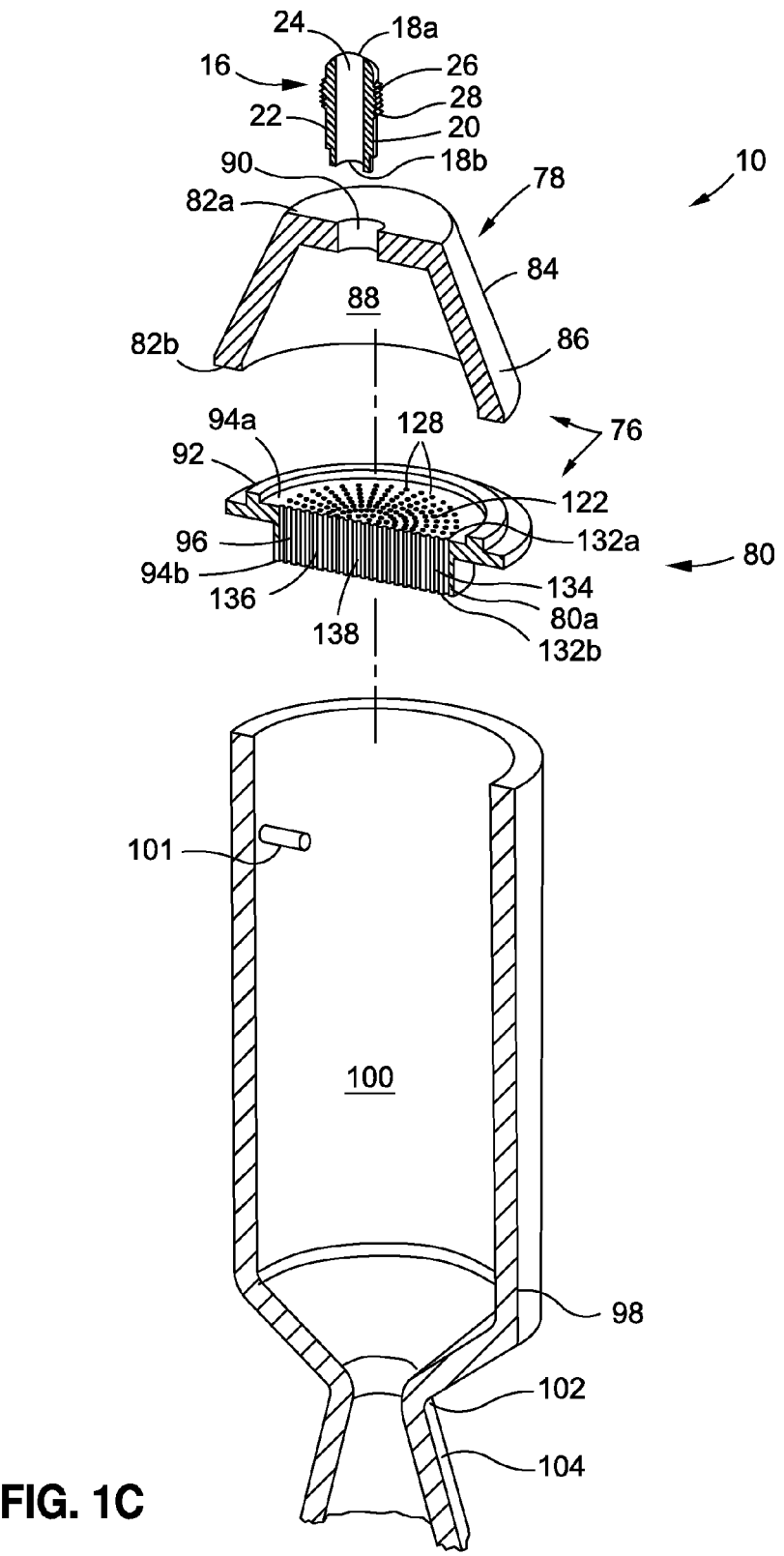
FIG. 1C is an illustration of an exploded sectional view of the liquid injector system and the combustion engine of FIG. 1B.

FIG. 1B is an illustration of a sectional view of an embodiment of a premixed liquid propellant propulsion system 14 with an embodiment of the liquid injector system 10 in the combustion engine 12 of the disclosure. FIG. 1C is an illustration of an exploded sectional view of the liquid injector system 10 and the combustion engine 12 of FIG. 1B.

In one embodiment, as shown in FIGS. 1A-1C, there is provided a liquid injector system 10 for a combustion engine 12 which is preferably positioned within the combustion engine 12. As shown in FIG. 1B, the liquid injector system 10 and the combustion engine 12 are components of the premixed liquid propellant propulsion system 14 (see also FIG. 7). Preferably, the liquid injector system 10 (see FIGS. 1A-1C) is a rocket liquid injector system 10a (see FIG. 7).

As further shown in FIGS. 1A-1C, the liquid injector system 10 comprises a single feed inlet 16. As shown in FIGS. 1B, 1C, the single feed inlet 16 comprises an inlet end 18a, an outlet end 18b, and an inlet body 20. Preferably, the inlet body 20 (see FIGS. 1B, 1C) is substantially cylindrical in shape and has an exterior 22 (see FIGS. 1B, 1C) that is preferably airtight, and an interior 24 (see FIGS. 1B, 1C) that is preferably hollow. The inlet body 20 (see FIG. 1C) may have a threaded connector portion 26 (see FIG. 1C), or another suitable connector, formed or attached around an outer portion 28 (see FIG. 1C) of the inlet body 20 (see FIG. 1C) for connection to one or more separate feed supplies.

Figure 4:
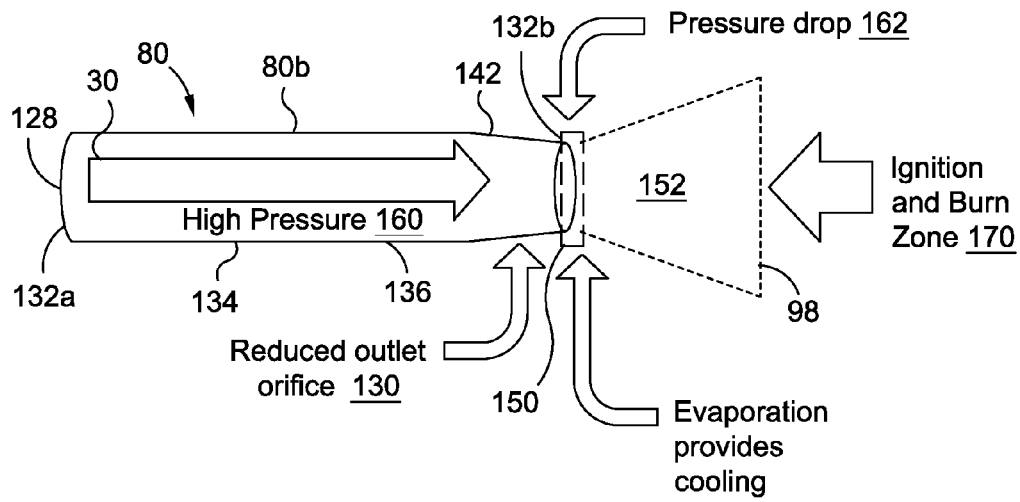
FIG. 4 is an illustration of a schematic diagram of a liquid-to-gas zone and an embodiment of a single injector hole liquid injector with a reduced outlet orifice.
Figure 5:
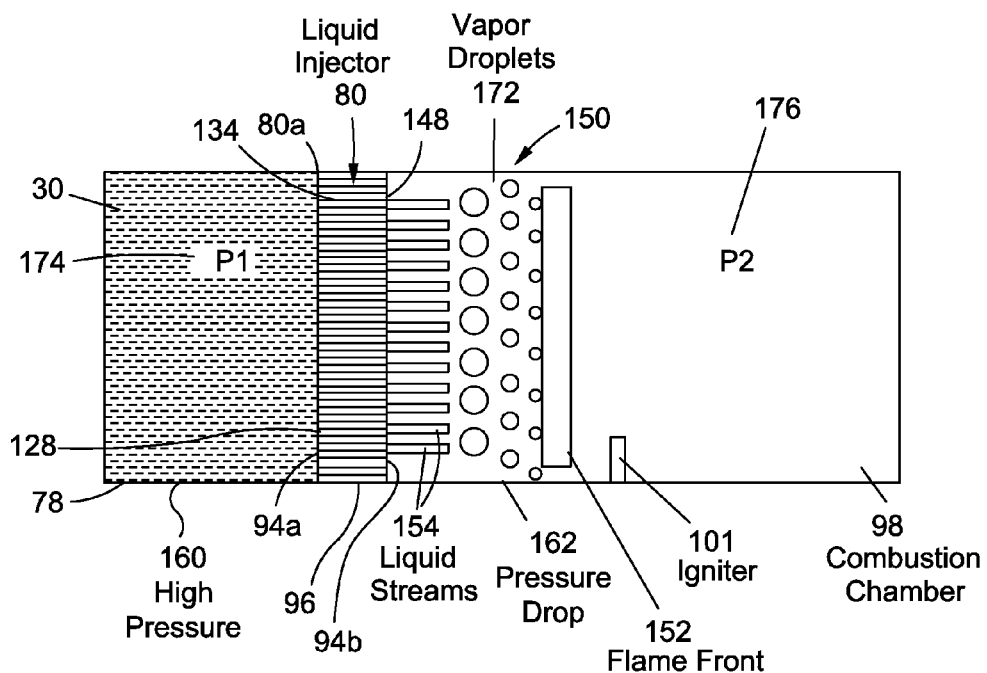
FIG. 5 is an illustration of a schematic diagram of a liquid-to-gas zone showing a pressure drop between an embodiment of a liquid injector and a combustion chamber.

The single feed inlet 16 (see FIG. 1A) is preferably configured to receive a premixed liquid propellant 30 (see FIG. 1A) under pressure, and preferably under a high pressure 160 (see FIGS. 4, 5). The premixed liquid propellant 30 (see FIGS. 1A, 7) preferably comprises a mixture 32 (see FIG. 7) of one or more fuels 34 (see FIG. 7) and an oxidizer 36 (see FIG. 7). Preferably, the mixture 32 (see FIG. 7) is a homogeneous mixture of the one or more fuels 34 (see FIG. 7) and the oxidizer 36 (see FIG. 7).

The one or more fuels 34 (see FIG. 7) preferably includes acetylene, ethylene, ethane, methane, or a combination of two or more thereof. However, other suitable fuels may also be used. The oxidizer 36 (see FIG. 7) preferably includes nitrous oxide 38 (see FIG. 7) or liquid oxygen. However, other suitable oxidizers may also be used.

The premixed liquid propellant propulsion system 14 (see FIG. 1A) with the liquid injector system 10 (see FIG. 1A) enables usage of multiple premixed propellants in a single feed propulsion system. Preferred examples of premixed liquid propellants 30 include, but are not limited to, such nitrous oxide fuel blends (NOFB) as nitrous oxide/ethylene ($N_2O/C_2H_4$), nitrous oxide/acetylene ($N_2O/C_2H_2$), and nitrous oxide/ethylene/acetylene $N_2O/C_2H_4/C_2H_2$ combinations.

The liquid injector system 10 (see FIG. 1B) further comprises a liquid injector assembly 76 (see FIG. 1A) coupled to the single feed inlet 16 (see FIG. 1B). The liquid injector assembly 76 (see FIG. 1A) comprises a hollow dome 78 (see FIGS. 1A, 1B) coupled to the single feed inlet 16 (see FIGS. 1A, 1B). The liquid injector assembly 76 (see FIG. 1A) further comprises a liquid injector 80 (see FIGS. 1A, 1B) coupled to the hollow dome 78 (see FIGS. 1A, 1B).

As shown in FIGS. 1B and 1C, the hollow dome 78 has a first end 82a, a second end 82b and a dome body 84 extending therebetween. The hollow dome 78 (see FIG. 1C) further has an exterior 86 (see FIG. 1C) that is preferably airtight, and an interior 88 (see FIG. 1C) that is hollow. As further shown in FIGS. 1B and 1C, the first end 82a of the hollow dome 78 preferably has a through opening 90 configured to receive and connect to the outlet end 18b of the single feed inlet 16. The second end 82b (see FIGS. 1B, 1C) of the hollow dome 78 (see FIGS. 1B, 1C) is preferably configured to fit within a groove 92 (see FIGS. 1B, 1C) formed in the top of liquid injector 80 (see FIGS. 1B, 1C), such that the hollow dome 78 (see FIG. 1B) covers an injector inlet side 94a (see FIG. 1B) of the liquid injector 80 (see FIG. 1B). The liquid injector 80 is discussed in further detail below.

As shown in FIG. 1A, the liquid injector system 10 further comprises a liquid-to-gas zone 150 located downstream of the liquid injector 80 and preferably between the liquid injector 80 and a flame front 152 in a combustion chamber 98 of the combustion engine 12. As shown in FIG. 1A, the liquid-to-gas zone 150 comprises a liquid phase 144 and a gas phase 146. In one embodiment, the liquid phase 144 (see FIG. 1A) preferably comprises one or more liquid streams 154 (see FIG. 1A), and the gas phase 146 (see FIG. 1A) preferably comprises one or more vapor droplets 172.

As further shown in FIGS. 1A-1C, the combustion chamber 98 comprises an interior combustion portion 100 (see FIG. 1B), a throat portion 102, and a nozzle portion 104. An igniter 101 (see FIGS. 1A-1C) is preferably attached within the interior combustion portion 100 (see FIGS. 1A-1C) below a flame front 152 (see FIG. 1A). The igniter 101 may comprise electrical igniters, such as electric spark plugs or hot wires; pyrotechnic igniters, such as a rocket motor charge or a solid gas charge; or another suitable igniter. The igniter 101 is used to cause the premixed liquid propellant 30 to begin to react, such as a self-sustaining burn, to generate thrust. At an engine exit 106 (see FIG. 1A), exhaust gas 108 (see FIG. 1A) is preferably discharged from the engine 12 (see FIG. 1A).

The premixed liquid propellant propulsion system 14 (see FIG. 1B) preferably comprises a premixed liquid propellant assembly 40 (see FIG. 1B). As shown in FIG. 1B, the premixed liquid propellant 30 is preferably supplied to the liquid injector system 10 via the premixed liquid propellant assembly 40 coupled to the single feed inlet 16 of the liquid injector system 10. The premixed liquid propellant assembly 40 (see FIG. 1B) supplies the premixed liquid propellant 30 (see FIG. 1B) under pressure, preferably a high pressure, to the liquid injector system 10 (see FIG. 1B). The high pressure is preferably in a range of from about 500 psi (pounds per square inch) to about 1700 psi. The pressure drop or pressure differential may preferably be greater than 200 psi (pounds per square inch), and more preferably, between 200 psi and 500 psi. However, another suitable pressure drop may be used.

As shown in FIG. 1B, the premixed liquid propellant assembly 40 preferably comprises a premixed liquid propellant storage tank 42 for storing the premixed liquid propellant 30. The premixed liquid propellant 30 is preferably mixed in a container (not shown) separate from the premixed liquid propellant storage tank 42 (see FIG. 1B), and the premixed liquid propellant 30 may then be transported or supplied to the premixed liquid propellant storage tank 42 (see FIG. 1B) after mixing. As used herein, "premixed liquid propellant" means any combination of an oxidizer and one or more fuels that may be premixed, stored in a single storage tank, and fed or supplied into a premixed liquid propellant propulsion system 14 (see FIG. 1B, 7). In the premixed liquid propellant storage tank 42 (see FIG. 1B), the premixed liquid propellant 30 (see FIG. 1B) preferably remains chemically separate, but in a suspended, evenly distributed, i.e., homogeneous, state as a pressurized liquid blend. For example, the premixed liquid propellant 30 (see FIG. 1B) may preferably be stored in the storage tank 42 (see FIG. 1B) at a cold temperature in a range of from about 0° C. (zero degrees Celsius) to about −60° C. (minus sixty degrees Celsius) and at a pressure about 200 psi (pounds per square inch) above the saturated vapor pressure. As used herein, "saturated vapor pressure" means in a closed container, the process of evaporation will proceed until there are as many molecules returning to the liquid as there are escaping, and at that point the vapor is considered saturated, and the pressure of that vapor is referred to as the saturated vapor pressure. At pressures above the vapor pressure, saturated liquids turn into only their liquid phase. This cold, pressurized premixed liquid propellant 30 (see FIG. 1B) is preferably not placed into an active condition state or phase until it is depressurized and the constituents (fuel(s) and oxidizer) transit into a more reactive gaseous state or phase. Alternatively, for example, the premixed liquid propellant 30 (see FIG. 1B) may be stored in the storage tank 42 (see FIG. 1B) at room temperature and at a pressure of from about 1000 psi (pounds per square inch) to about 1700 psi by using an inert gas. The premixed liquid propellant 30 (see FIG. 1A) and the exhaust gas 108 (see FIG. 1A) as disclosed herein may be chemically preferable to use, as compared to known monopropellants, for example, hydrazine.

As shown in FIG. 1B, the premixed liquid propellant assembly 40 further comprises a feed valve 44 coupled to the single feed inlet 16 for controlling flow of the premixed liquid propellant 30 into the liquid injector system 10. As further shown in FIG. 1B, the premixed liquid propellant assembly 40 further comprises a premixed liquid propellant feed line 46 connected between the premixed liquid propellant storage tank 42 and the feed valve 44. FIG. 1B shows the premixed liquid propellant feed line 46 having a first end 48a connected to the premixed liquid propellant storage tank 42, and having a second end 48b connected to the feed valve 44. The feed valve 44 (see FIG. 1B) may be opened or closed to control the flow of the premixed liquid propellant 30 (see FIG. 1B) into the liquid injector system 10 (see FIG. 1B) via the single feed inlet 16 (see FIG. 1B).

The premixed liquid propellant propulsion system 14 (see FIG. 1B) preferably further comprises a purge gas assembly 54 (see FIG. 1B). As shown in FIG. 1B, a purge gas 50 is preferably supplied to the liquid injector system 10 via the purge gas assembly 54, which is coupled to the single feed inlet 16 of the liquid injector system 10. The purge gas assembly 54 (see FIG. 1B) supplies the purge gas 50 (see FIG. 1B) under pressure, preferably a high pressure, to the liquid injector system 10 (see FIG. 1B). The single feed inlet 16 (see FIG. 1B) is preferably configured to receive the purge gas 50 (see FIG. 1B) under pressure, and preferably under a high pressure. The high pressure is preferably in a range of from about 500 psi (pounds per square inch) to about 1700 psi. The pressure drop or pressure differential may preferably be greater than 200 psi, and more preferably, between 200 psi and 500 psi. However, another suitable pressure drop may be used.

The purge gas 50 (see FIGS. 1B, 7) is preferably an inert gas 52 (see FIG. 7), including nitrogen, helium, tridyne, or a combination of two or more thereof. However, other suitable inert gases may also be used. As used herein, "tridyne" means a dilute mixture of hydrogen and oxygen in a helium or nitrogen base, which is passed over a catalyst bed and heated by the catalyst reaction of the hydrogen and oxygen.

Figure 2A:
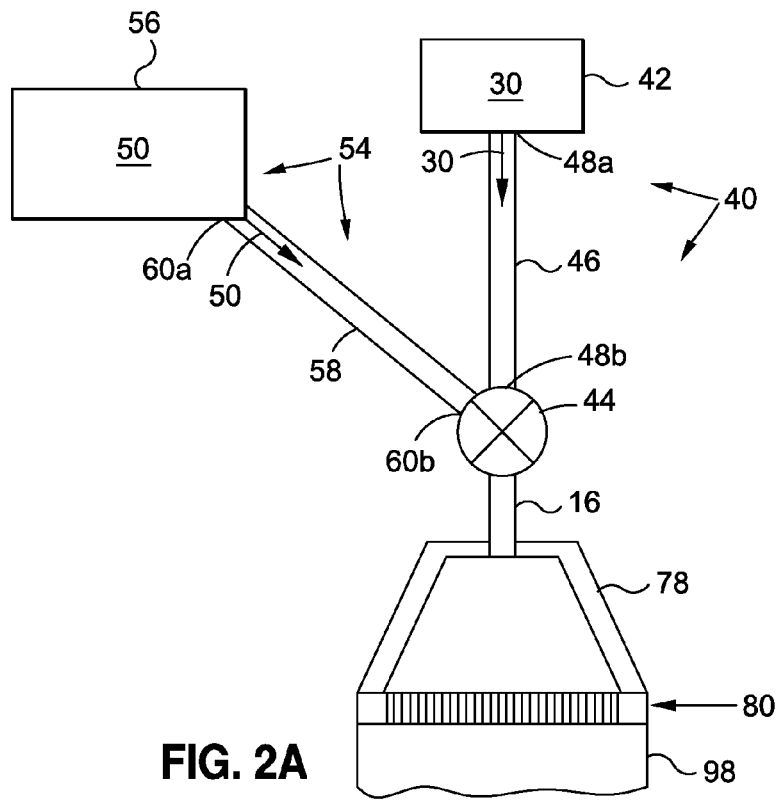
FIG. 2A is an illustration of a schematic diagram of an embodiment of a premixed liquid propellant assembly and an embodiment of a purge gas assembly of the disclosure.

FIG. 2A is an illustration of a schematic diagram of an embodiment of a premixed liquid propellant assembly 40 and an embodiment of a purge gas assembly 54 of the disclosure. As shown in FIGS. 1B and 2A, in this embodiment, the purge gas assembly 54 preferably comprises a purge gas storage tank 56 and a purge gas feed line 58 connected between the purge gas storage tank 56 and the feed valve 44 coupled to the single feed inlet 16. As further shown in FIGS. 1B and 2A, the purge gas feed line 58 has a first end 60a connected to the purge gas storage tank 56 and a second end 60b connected to the feed valve 44. When the feed valve 44 (see FIGS. 1B, 2A) is closed, the purge gas 50 (see FIGS. 1B, 2A) may flow into a liquid injector 80 (see FIGS. 1B, 2A) of the liquid injector system 10 (see FIG. 1B) via the single feed inlet 16 (see FIGS. 1B, 2A).

Figure 2B:
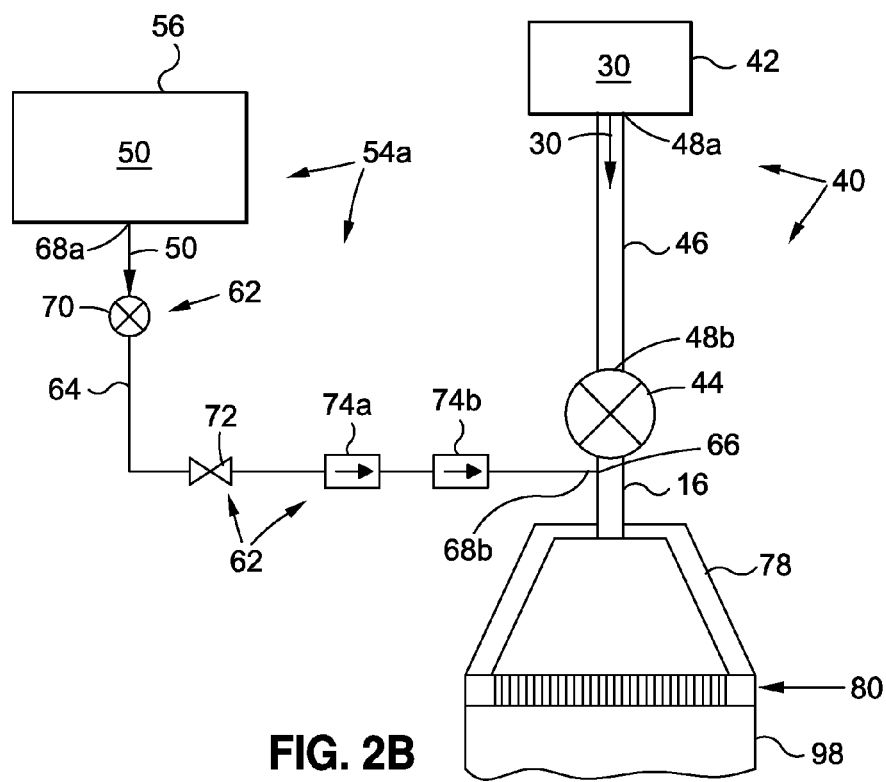
FIG. 2B is an illustration of a schematic diagram of the premixed liquid propellant assembly of FIG. 2A and another embodiment of a purge gas assembly of the disclosure.

FIG. 2B is an illustration of a schematic diagram of the premixed liquid propellant assembly 40 of FIG. 2A and another embodiment of a purge gas assembly 54a of the disclosure. As shown in FIG. 2B, in this embodiment, the purge gas assembly 54a comprises the purge gas storage tank 56, a plurality of valves 62, and a purge gas tap line 64 connecting the purge gas storage tank 56 and the plurality of valves 62, and being connected to the single feed inlet 16 at a location 66 below the feed valve 44. As further shown in FIG. 2B, the purge gas tap line 64 has a first end 68a connected to the purge gas storage tank 56 and a second end 68b connected to the location 66 below the feed valve 44. When the feed valve 44 (see FIGS. 1A, 2A) is closed, the purge gas 50 (see FIGS. 1A, 2A) may flow into a liquid injector 80 (see FIGS. 1A, 2A) of the liquid injector system 10 (see FIG. 1A) via the single feed inlet 16 (see FIGS. 1A, 2A).

As shown in FIG. 2B, the plurality of valves 62 preferably comprise at least one purge flow valve 70, at least one needle valve 72 to regulate the flow of the purge gas 50, and at least one check valve, and preferably two check valves comprising a first check valve 74a and a second check valve 74b to facilitate safe operation. Although this may also be accomplished with a single check valve, two check valves are preferred. The first check valve 74a and the second check valve 74b prevent flow of the premixed liquid propellant 30 into the purge gas assembly 54.

As shown in FIGS. 1B and 1C, the liquid injector 80 comprises an injector inlet side 94a, an injector outlet side 94b, and an injector body 96 extending therebetween. As further shown in FIGS. 1B and 1C, the liquid injector 80 comprises a central manifold portion 122 partially surrounded by the groove portion 92. The second end 82b (see FIG. 1B) of the hollow dome 78 (see FIG. 1B) is preferably welded to the liquid injector 80 (see FIG. 1B) via the groove portion 92 (see FIG. 1B). However, the hollow dome 78 (see FIG. 1B) may also be attached to the liquid injector 80 (see FIG. 1B) via one or more attachment elements (not shown), such as bolts (not shown), such as, for example, with liquid injectors 80 designed for testing.

As shown in FIGS. 1B and 1C, the central manifold portion 122 has one or more injector holes 128 configured to receive and inject the premixed liquid propellant 30 or the purge gas 50 through the injector body 96 of the liquid injector 80 and into the combustion chamber 98. The combustion chamber 98 (see FIG. 1B) is preferably coupled to the liquid injector 80 (see FIG. 1B) and positioned downstream of the injector outlet side 94b (see FIG. 1B) of the liquid injector 80 (see FIG. 1B). The top of the combustion chamber 98 (see FIG. 1B) is preferably welded to a bottom portion of the liquid injector 80 (see FIG. 1B). However, the combustion chamber 98 (see FIG. 1B) may also be attached to the liquid injector 80 (see FIG. 1B) via one or more attachment elements (not shown), such as bolts (not shown), such as, for example, with liquid injectors 80 designed for testing.

Each injector hole 128 (see FIGS. 1B, 1C) preferably comprises an inlet orifice 132a on the injector inlet side 94a (see FIGS. 1B, 1C), an outlet orifice 132b (see FIGS. 1B, 1C) on the injector outlet side 94b (see FIGS. 1B, 1C), and a channel 134 (see FIGS. 1B, 1C) extending between the inlet orifice 132a (see FIGS. 1B, 1C) and the outlet orifice 132b (see FIGS. 1B, 1C) and through the injector body 96 (see FIGS. 1B, 1C). The channel 134 (see FIGS. 1B, 1C) is preferably hollow and comprises sides 136 (see FIGS. 1B, 1C). Each injector hole 128 (see FIGS. 1B, 1C) may preferably each have an outer diameter with a diameter size greater than 0.005 inch, and may, more preferably, each have an outer diameter with a diameter size greater than 0.25 inch. The diameter size of the injector holes 128 chosen depends on how much premixed liquid propellant 30 is flowing through the injector holes 128. Once a flow rate is determined, the size of the injector holes 128 may be determined to ensure a pressure differential is obtained.

In one embodiment, as shown in FIGS. 1B and 1C, the one or more injector holes 128 each comprise a channel 134 having sides 136 with a straight configuration 138. The sides 136 (see FIG. 1B) are preferably perpendicular to both the injector inlet side 94a (see FIG. 1B) and the injector outlet side 94b (see FIG. 1B) of the liquid injector 80 (see FIG. 1B).

Figure 3A:
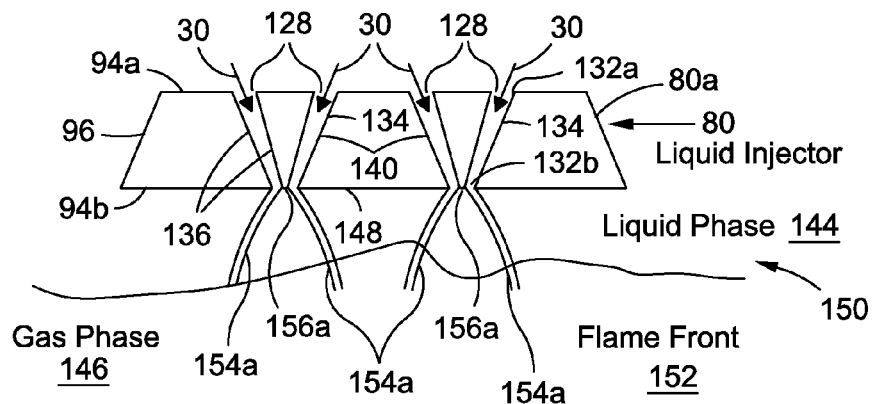
FIG. 3A is an illustration of a schematic diagram of a liquid-to-gas zone with impinging liquid streams at a surface of an embodiment of a multiple injector hole liquid injector of the disclosure.
Figure 3B:
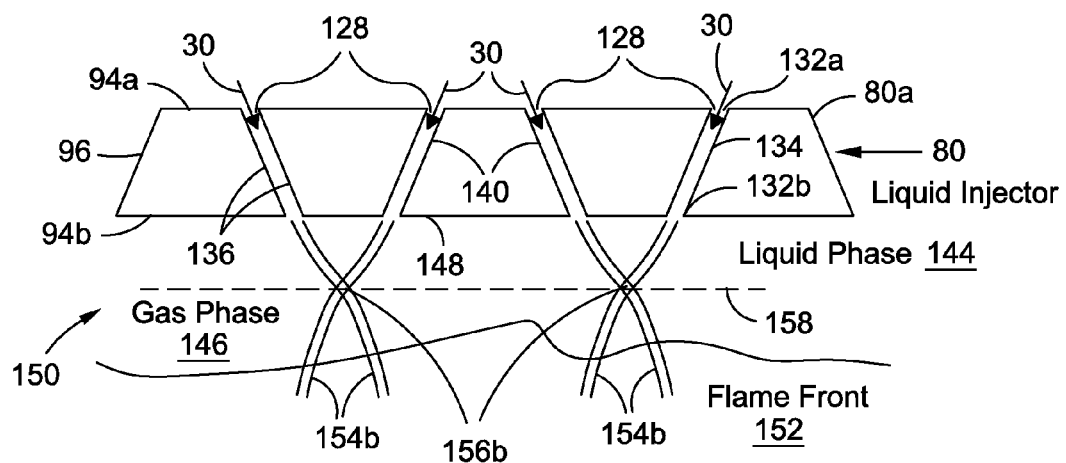
FIG. 3B is an illustration of a schematic diagram of a liquid-to-gas zone with impinging liquid streams at a distance from a surface of an embodiment of a multiple injector hole liquid injector of the disclosure.

In another embodiment, as shown in FIGS. 3A-3B, the one or more injector holes 128 each comprise a channel 134 having sides 136 with a sloped configuration 140. In another embodiment, as shown in FIG. 4, the one or more injector holes 128 each comprise a channel 134 having sides 136 with a tapered nozzle configuration 142.

Figure 7:
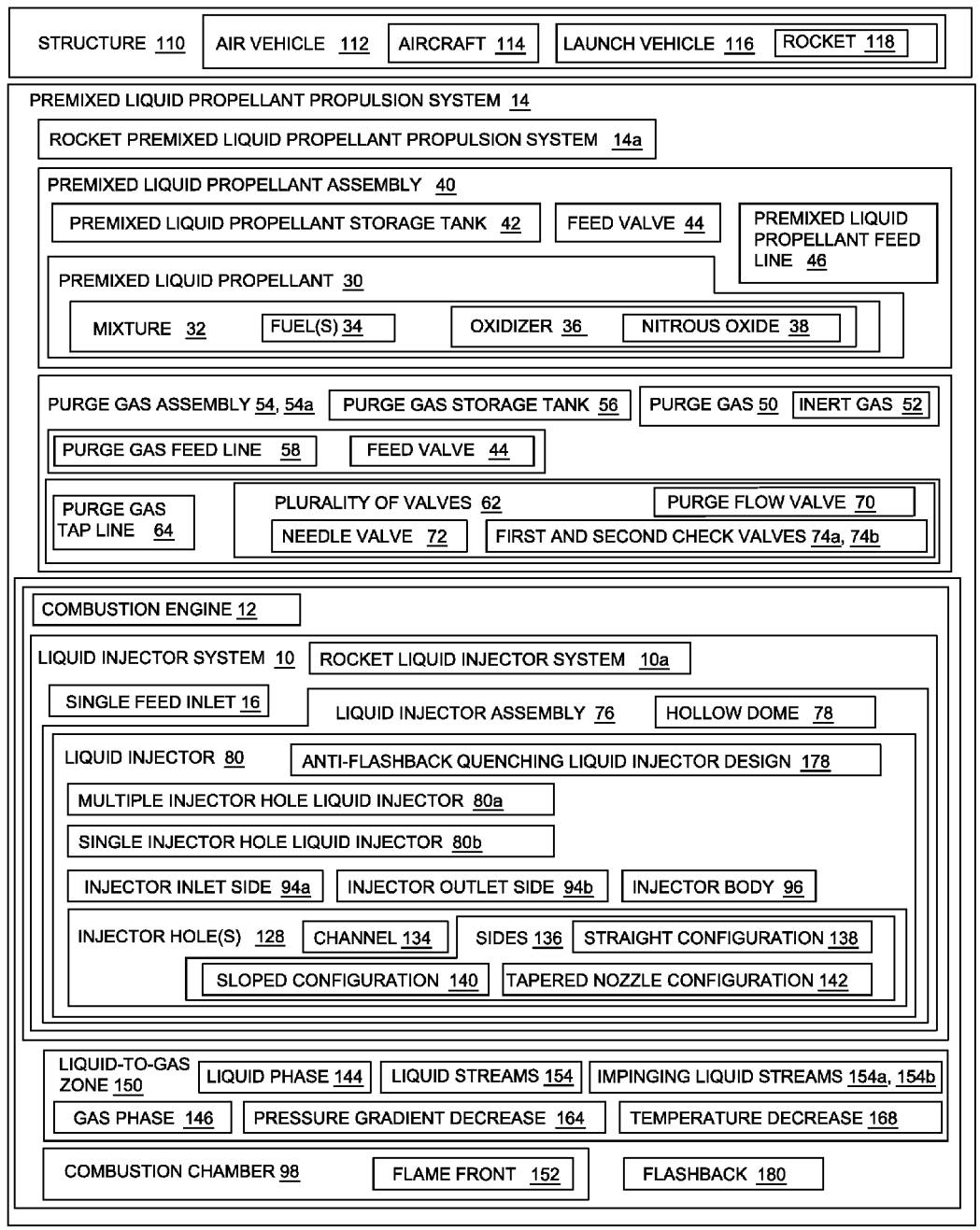
FIG. 7 is an illustration of a functional block diagram of embodiments of a premixed liquid propellant propulsion system of the disclosure.

FIGS. 1A, 3A-5 and 7 show various embodiments of the liquid injector system 10 and the liquid-to-gas zone 150 located between the injector outlet side 94b (see FIGS. 3A, 5) of the liquid injector 80 (see FIGS. 1A, 3A, 5) and the flame front 152 (see FIGS. 1A, 5) in the combustion chamber 98 (see FIGS. 1A, 5) of the combustion engine 12 (see FIGS. 1A, 7). A pressure gradient decrease 164 (see FIG. 7) between the liquid injector 80 (see FIGS. 1A, 5, 7) and the combustion chamber 98 (see FIGS. 1A, 5, 7) causes the premixed liquid propellant 30 (see FIGS. 1A, 5, 7) to expand from the liquid phase 144 (see FIGS. 1A, 3A, 7) into the gas phase 146 (see FIGS. 1A, 3A, 7). This causes a temperature decrease 168 (see FIG. 7) at the liquid-to-gas zone 150 (see FIGS. 1A, 3A-5, 7). The combination of the pressure gradient decrease 164 (see FIG. 7) and the temperature decrease 168 (see FIG. 7) at the liquid-to-gas zone 150 (see FIGS. 1A, 3A-5, 7) preferably prevents or mitigates the flame front 152 (see FIGS. 1A, 5, 7) from propagating upstream of the combustion chamber 98 (see FIGS. 1A, 5, 7). This achieves an anti-flashback quenching liquid injector design 178 (see FIGS. 1A, 7) and function of the liquid injector 80 (see FIGS. 1A, 7).

FIG. 3A is an illustration of a schematic diagram of a liquid-to-gas zone 150 with impinging liquid streams 154a at a surface 148 of an embodiment of the liquid injector 80, such as in the form of a multiple injector hole liquid injector 80a of the disclosure. As shown in FIG. 3A, the premixed liquid propellant 30 initially flows into the liquid injector 80 via injector holes 128 at the injector inlet side 94a. FIG. 3A shows each injector hole 128 having the inlet orifice 132a, the outlet orifice 132b, and the channel 134 extending therebetween.

As shown in FIG. 3A, each channel 134 has sides 136 with the sloped configuration 140. The sloped configuration 140 facilitates the premixed liquid propellant 30 to flow through the channel 134 at a high pressure and a high velocity. In addition, the sloped configuration 140 (see FIG. 3A) causes the premixed liquid propellant 30 (see FIG. 3A) exiting the injector outlet side 94b (see FIG. 3A) of the liquid injector 80 (see FIG. 3A) to form impinging liquid streams 154a (see FIG. 3A). In the embodiment shown in FIG. 3A, the impinging liquid streams 154a break up at impingement points 156a at the surface 148 of the injector outlet side 94b and are atomized into vapor droplets 172 (see FIG. 5) to facilitate stability of the flame front 152. The impinging liquid streams 154a (see FIG. 3A) expand from the liquid phase 144 (see FIG. 3A) to the gas phase 146 (see FIG. 3A) in the liquid-to-gas zone 150. The flame front 152 (see FIG. 3A) is preferably located at the liquid/gas interface in the liquid-to-gas zone 150 (see FIG. 3A).

FIG. 3B is an illustration of a schematic diagram of a liquid-to-gas zone 150 with impinging liquid streams 154b at a distance 158 shown in broken line from the surface 148 of the liquid injector 80, such as in the form of multiple injector hole liquid injector 80a of the disclosure. As shown in FIG. 3B, the premixed liquid propellant 30 initially flows into the liquid injector 80 via injector holes 128 at the injector inlet side 94a. FIG. 3B shows each injector hole 128 having the inlet orifice 132a, the outlet orifice 132b, and the channel 134 extending therebetween.

As shown in FIG. 3B, each channel 134 has sides 136 with the sloped configuration 140. The sloped configuration 140 facilitates the premixed liquid propellant 30 to flow through the channel 134 at a high pressure and a high velocity. In addition, the sloped configuration 140 (see FIG. 3B) causes the premixed liquid propellant 30 (see FIG. 3B) exiting the injector outlet side 94b (see FIG. 3B) of the liquid injector 80 (see FIG. 3B) to form impinging liquid streams 154b (see FIG. 3B). In the embodiment shown in FIG. 3B, the impinging liquid streams 154b break up at impingement points 156b at the distance 158 from the surface 148 of the liquid injector 80 and are atomized into vapor droplets 172 (see FIG. 5) to facilitate stability of the flame front 152. The impinging liquid streams 154b (see FIG. 3B) expand from the liquid phase 144 (see FIG. 3B) to the gas phase 146 (see FIG. 3B) in the liquid-to-gas zone 150. The flame front 152 (see FIG. 3B) is preferably located at the liquid/gas interface in the liquid-to-gas zone 150 (see FIG. 3B).

FIG. 4 is an illustration of a schematic diagram of the liquid-to-gas zone 150 and an embodiment of a liquid injector 80, in the form of a single injector hole liquid injector 80b, with a reduced outlet orifice 130. The single injector hole liquid injector 80b (see FIG. 4) has a single injector hole 128 (see FIG. 4). As shown in FIG. 4, the single injector hole 128 comprises an inlet orifice 132a, an outlet orifice 132b, and a channel 134 extending therebetween. The channel 134 (see FIG. 4) has sides 136 (see FIG. 4) with a tapered nozzle configuration 142 (see FIG. 4). In this tapered nozzle configuration 142 (see FIG. 4), the outlet orifice 132b (see FIG. 4) of the channel 134 (see FIG. 4) is in the form of the reduced outlet orifice 130 (see FIG. 4). The reduced outlet orifice 130 (see FIG. 4) has a smaller diameter and a reduced size, as compared to a diameter and size of the inlet orifice 132a (see FIG. 4) of the channel 134 (see FIG. 4).

As further shown in FIG. 4, the premixed liquid propellant 30 flows into and through the channel 134 of the single injector hole liquid injector 80b at a high pressure 160 and high velocity. The high pressure may preferably be in a range of from about 500 psi (pounds per square inch) and 1700 psi, and the pressure drop or pressure differential may be greater than 200 psi, and more preferably, between 200 psi and 500 psi. However, another suitable pressure drop may be used.

The tapered nozzle configuration 142 (see FIG. 4) with the reduced outlet orifice 130 (see FIG. 4) facilitates a high velocity liquid flow injection of the premixed liquid propellant 30 (see FIG. 4) through the single injector hole liquid injector 80b (see FIG. 4) and out to the liquid-to-gas zone 150 (see FIG. 4) and the combustion chamber 98 (see FIG. 4), which is at a lower pressure. The liquid injector 80 (see FIG. 4), such as in the form of the single injector hole liquid injector 80b (see FIG. 4), injects the premixed liquid propellant 30 (see FIG. 4) under high pressure 160 (see FIG. 4) and high velocity into a lower pressure combustion chamber 98 (see FIG. 4). The result is a pressure drop 162 (see FIG. 4) causing atomization of the premixed liquid propellant 30 (see FIG. 4) into extremely small vapor droplets 172 (see FIG. 5) for ignition at the flame front 152 (see FIG. 4). The extremely small vapor droplets 172 (see FIG. 5) provide a large surface for rapid vaporization and an expected controlled burn in the ignition and burn zone 170 (see FIG. 4).

The liquid injector 80 (see FIG. 4) acts as a liquid quench and takes advantage of the Joule-Thomson effect, which means herein, a temperature change of a liquid or gas when it is forced through a valve or porous plug while being kept insulated, so that no heat is exchanged with the environment. As the premixed liquid propellant 30 (see FIG. 4) rapidly expands and evaporates in the liquid-to-gas zone 150 (see FIG. 4), the Joule-Thomson effect provides or causes a temperature decrease 168 (see FIG. 7), or cooling, at the liquid-to-gas zone 150 (see FIG. 4) to aid in mitigation or prevention of flashback 180 (see FIG. 7) of the flame front 152 (see FIG. 4) from flashing back or propagating upstream of the combustion chamber 98 (see FIG. 4).

FIG. 5 is an illustration of a schematic diagram of a liquid-to-gas zone 150 and showing a pressure drop 162 between an embodiment of a liquid injector 80, such as in the form of a multiple injector hole liquid injector 80a, and the combustion chamber 98. As shown in FIG. 5, the premixed liquid propellant 30 flows into and through the hollow dome 78 and the liquid injector 80 at a high pressure 160. The premixed liquid propellant 30 (see FIG. 5) has a first higher pressure (P1) 174 (see FIG. 5). The combustion chamber 98 (see FIG. 5) has a second lower pressure (P2) 176 (see FIG. 5). As used herein, "pressure drop" means a drop or decrease in the pressure from P1 to P2, that is, P1 is at a higher or greater pressure than P2, and P2 is at a lower or lesser pressure than P1. For example, the first higher pressure (P1) may be in a range of from about 500 psi (pounds per square inch) to about 1700 psi, and the second lower pressure (P2) may be in a range of from about 300 psi to about 1500 psi. The pressure drop or pressure differential between the first higher pressure (P1) and the second lower pressure (P2) is preferably in a range of from about 200 psi to about 500 psi.

As further shown in FIG. 5, the premixed liquid propellant 30 flows into and is injected through injector holes 128 at the injector inlet side 94a, through the channels 134 in the injector body 96 and exits the liquid injector 80 at the injector outlet side 94b to form liquid streams 154 at the surface 148 of the liquid injector 80. The liquid injector 80 (see FIG. 5) injects the premixed liquid propellant 30 (see FIG. 5) under high pressure 160 (see FIG. 5) and high velocity into the lower pressure combustion chamber 98 (see FIG. 5). The result is a pressure drop 162 (see FIG. 5) causing atomization of the premixed liquid propellant 30 (see FIG. 5) into extremely small vapor droplets 172 (see FIG. 5) for ignition at the flame front 152 (see FIG. 5). As the premixed liquid propellant 30 (see FIG. 5) rapidly expands and evaporates in the liquid-to-gas zone 150 (see FIG. 5), the temperature decreases at the liquid-to-gas zone 150 (see FIG. 5). The pressure gradient decrease 164 (see FIG. 7) and the temperature decrease 168 (see FIG. 7) preferably aid in mitigation or prevention of flashback 180 (see FIG. 7) of the flame front 152 (see FIG. 5) from flashing back or propagating upstream of the combustion chamber 98 (see FIG. 5).

Figure 6:
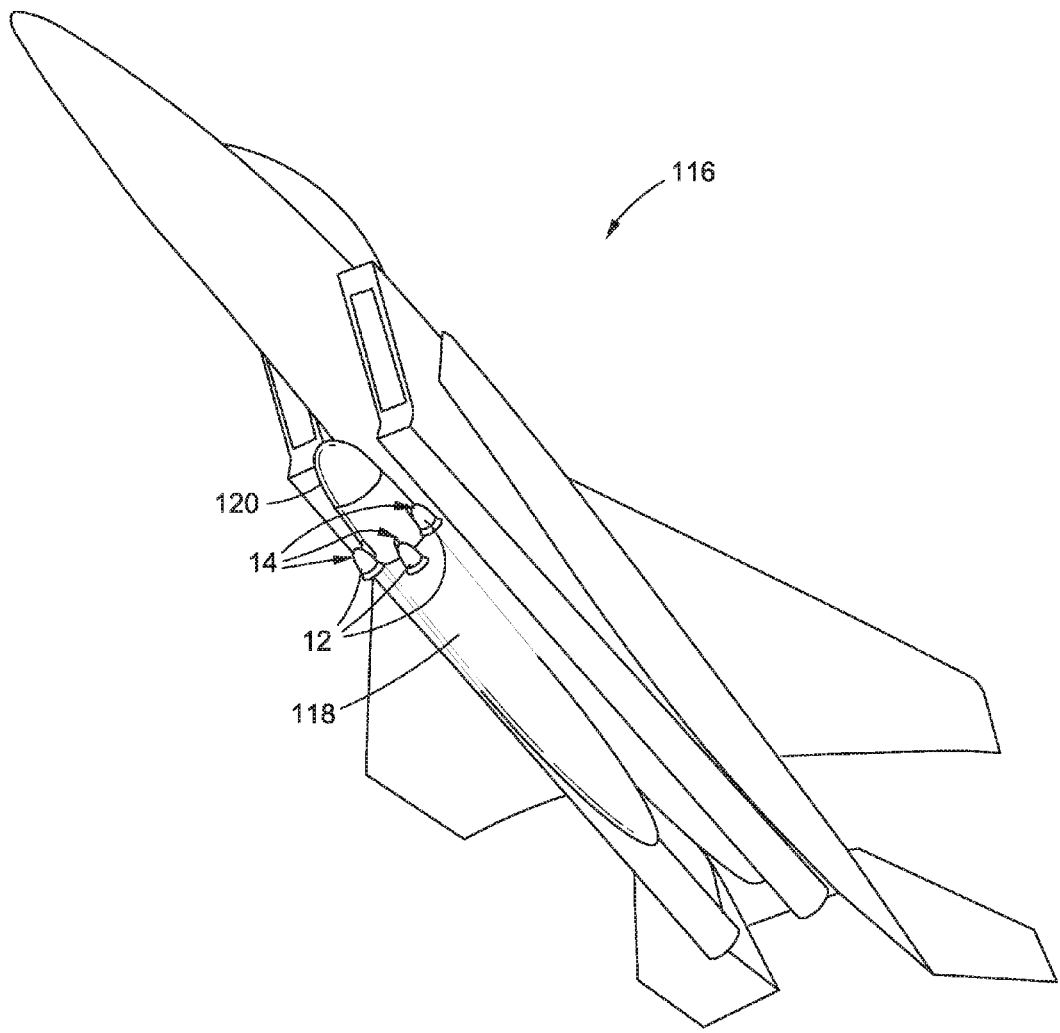
FIG. 6 is an illustration of a launch vehicle in the form of a rocket having combustion engines and embodiments of a premixed liquid propellant propulsion system of the disclosure.

FIG. 6 is an illustration of a launch vehicle 116 in the form of a rocket 118 having combustion engines 12 and embodiments of the premixed liquid propellant propulsion system 14 of the disclosure. As shown in FIG. 6, the launch vehicle 116, such as in the form of rocket 118, is carrying a payload 120 having combustion engines 12 and embodiments of the premixed liquid propellant propulsion system 14 disclosed herein.

In another embodiment there is provided a premixed liquid propellant propulsion system 14 (see FIGS. 1A, 7). FIG. 7 is an illustration of a functional block diagram of embodiments of a premixed liquid propellant propulsion system 14 of the disclosure. As shown in FIG. 7, the premixed liquid propellant propulsion system 14 is preferably a rocket premixed liquid propellant propulsion system 14a. However, the premixed liquid propellant propulsion system 14 (see FIG. 7) may also be used in other structures 110 (see FIG. 7), such as air vehicles 112 (see FIG. 7), including aircraft 114 (see FIG. 7) or other suitable structures with one or more combustion engines 12 (see FIG. 7). The structure 110 (see FIG. 7) may further comprise an automobile (not shown), or another suitable structure that includes or uses a combustion engine 12 (see FIGS. 1A and 7).

As shown in FIG. 7, the premixed liquid propellant propulsion system 14 comprises a premixed liquid propellant assembly 14 that supplies premixed liquid propellant 30 under pressure, preferably high pressure, to the liquid injector system 10 of the premixed liquid propellant propulsion system 14. The premixed liquid propellant 30 (see FIG. 7) comprises a mixture 32 (see FIG. 7) of one or more fuel(s) 34 (see FIG. 7) and an oxidizer 36 (see FIG. 7). As discussed above, the one or more fuels 34 (see FIG. 7) preferably includes acetylene, ethylene, ethane, methane, or a combination of two or more thereof. The oxidizer 36 (see FIG. 7) preferably includes nitrous oxide 38 (see FIG. 7) or liquid oxygen.

As shown in FIG. 7, and as discussed in detail above, the premixed liquid propellant assembly 40 (see FIG. 7) preferably comprises a premixed liquid propellant storage tank 42 (see FIG. 7) and a feed valve 44 (see FIG. 7) for controlling flow of the premixed liquid propellant 30 (see FIG. 7) into the liquid injector system 10 (see FIG. 7). The premixed liquid propellant assembly 40 (see FIG. 7) preferably further comprises a premixed liquid propellant feed line 46 (see FIG. 7) connected between the premixed liquid propellant storage tank 42 (see FIG. 7) and the feed valve 44 (see FIG. 7).

As shown in FIG. 7, the premixed liquid propellant propulsion system 14 further comprises a purge gas assembly 54 for supplying purge gas 50 under pressure, preferably high pressure, to the liquid injector system 10 of the premixed liquid propellant propulsion system 14. The purge gas 50 (see FIG. 7) preferably comprises an inert gas 52 (see FIG. 7) including nitrogen, helium, tridyne, or a combination of two or more thereof.

In one embodiment, discussed in detail above, the purge gas assembly 54 (see FIG. 7) comprises a purge gas storage tank 56 (see FIG. 7) and a purge gas feed line 58 (see FIG. 7) connected between the purge gas storage tank 56 (see FIG. 7) and the feed valve 44 (see FIG. 7). In another embodiment, discussed in detail above, the purge gas assembly 54a (see FIG. 2B) comprises a purge gas storage tank 56 (see FIG. 7), a plurality of valves 62 (see FIG. 7), and a purge gas tap line 64 (see FIG. 7) connecting the purge gas storage tank 56 (see FIG. 7) and the plurality of valves 62 (see FIG. 7). The plurality of valves 62 (see FIG. 7) preferably comprise at least one purge flow valve 70 (see FIG. 7), at least one needle valve 72 (see FIG. 7), and at least one check valve, and preferably two check valves 74a (see FIG. 7), 74b (see FIG. 7) to facilitate safe operation.

As shown in FIG. 7, the premixed liquid propellant propulsion system 14 further comprises a combustion engine 12. The combustion engine 12 (see FIG. 7), such as in the form of a rocket combustion engine 12a (see FIG. 1A), comprises the liquid injector system 10 (see FIG. 7) coupled to the combustion chamber 98 (see FIG. 7).

As further shown in FIG. 7, the liquid injector system 10, such as in the form of a rocket liquid injector system 10a, comprises the single feed inlet (see FIG. 7) configured to receive the premixed liquid propellant 30 (see FIG. 7) under pressure, or the purge gas 50 (see FIG. 7) under pressure, and comprises the liquid injector assembly 76 (see FIG. 7) coupled to the single feed inlet 16 (see FIG. 7).

As further shown in FIG. 7, the liquid injector assembly 76 comprises the hollow dome 78 coupled to the liquid injector 80. The liquid injector 80 (see FIG. 7) preferably has the anti-flashback quenching liquid injector design 178 (see FIG. 7). The liquid injector 80 (see FIG. 7) may comprise a multiple injector hole liquid injector 80a (see FIG. 7), or a single injector hole liquid injector 80b (see FIG. 7). As shown in FIG. 7, the liquid injector 80 comprises an injector inlet side 94a, an injector outlet side 94b, an injector body 96, and one or more injector holes 128 configured to receive and inject the premixed liquid propellant 30 or the purge gas 50 through the liquid injector 80 and into the combustion chamber 98 coupled to the liquid injector 80. The one or more injector holes 128 (see FIG. 7), as discussed in detail above, each comprise a channel 134 (see FIG. 7) having sides 136 (see FIG. 7) with one of a straight configuration 138 (see FIG. 7), a sloped configuration 140 (see FIG. 7), or a tapered nozzle configuration 142 (see FIG. 7). However, each channel 134 (see FIG. 7) may have another suitable configuration.

As shown in FIG. 7, the premixed liquid propellant propulsion system 14 further comprises the liquid-to-gas zone 150 having the liquid phase 144 and the gas phase 146 between an injector outlet side 94b of the liquid injector 80 and a flame front 152 in the combustion chamber 98. The liquid phase 144 (see FIG. 7) may comprise liquid streams 154 (see FIG. 7), such as in the form of impinging liquid streams 154a, 154b (see FIG. 7). A pressure gradient decrease 164 (see FIG. 7) between the liquid injector 80 (see FIG. 7) and the combustion chamber 98 (see FIG. 7) causes the premixed liquid propellant 30 (see FIG. 7) to expand from the liquid phase 144 (see FIG. 7) into the gas phase 146 (see FIG. 7). This causes a temperature decrease 168 (see FIG. 7) at the liquid-to-gas zone 150 (see FIG. 7). The pressure gradient decrease 164 (see FIG. 7) and the temperature decrease 168 (see FIG. 7) preferably prevent or mitigate the flame front 152 (see FIG. 7) from propagating upstream of the combustion chamber 98 (see FIG. 7). This achieves an anti-flashback quenching liquid injector design 178 (see FIG. 7).

Figure 8:
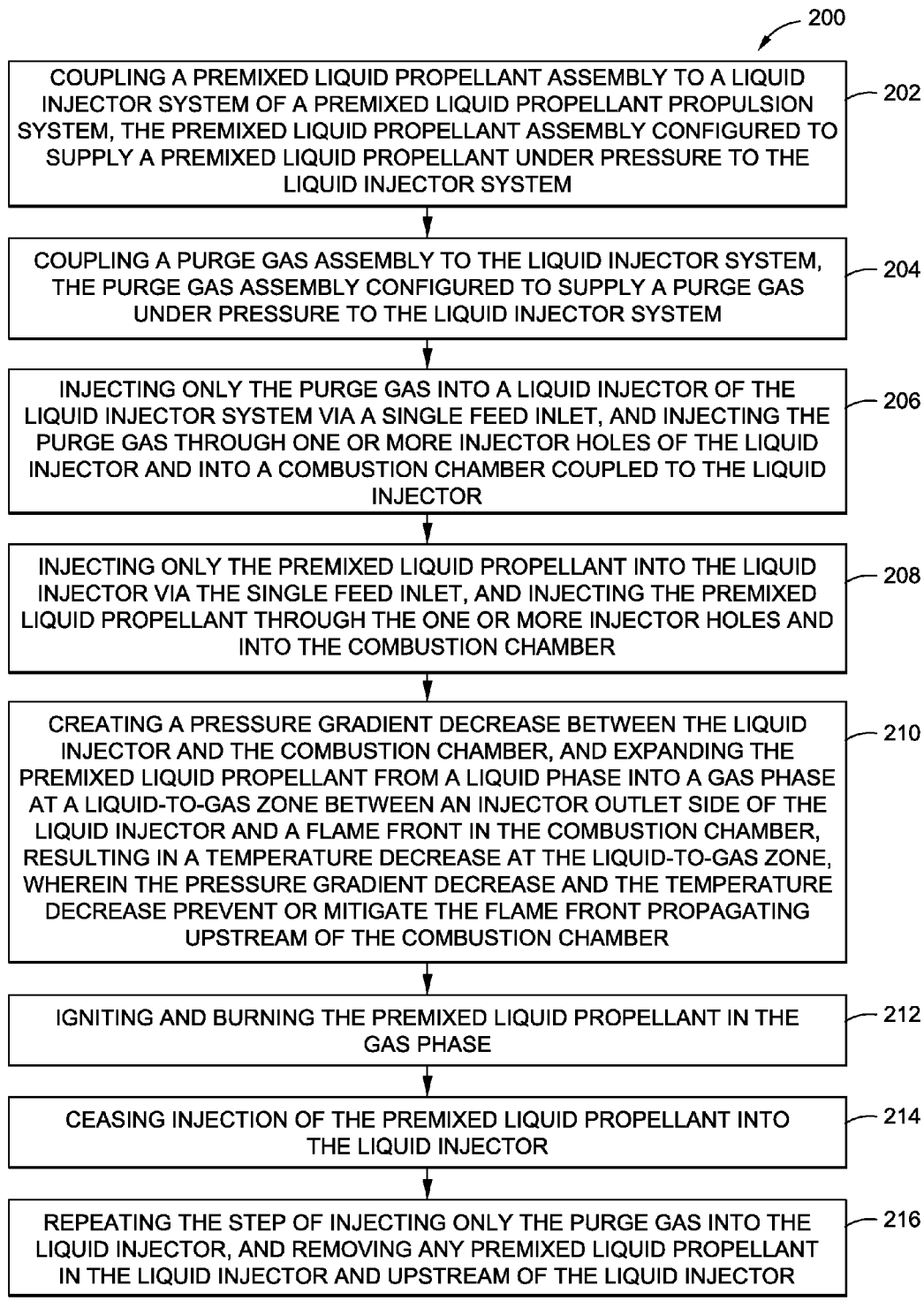
FIG. 8 is an illustration of a flow diagram showing an embodiment of a method of the disclosure.

In another embodiment there is provided a method 200 (see FIG. 8) of operating a premixed liquid propellant propulsion system 14 (see FIGS. 1B, 7). FIG. 8 is an illustration of a flow diagram showing an embodiment of the method 200 of the disclosure. Preferably, the method 200 (see FIG. 8) of operating the premixed liquid propellant propulsion system 14 (see FIGS. 1B, 7) comprises operating a rocket premixed liquid propellant propulsion system 14a (see FIG. 7).

As shown in FIG. 8, the method 200 comprises step 202 of coupling a premixed liquid propellant assembly 40 (see FIGS. 1A, 7) to a liquid injector system 10 (see FIGS. 1B, 7) of the premixed liquid propellant propulsion system 14 (see FIGS. 1B, 7). The premixed liquid propellant assembly 40 (see FIGS. 1B, 7) is preferably configured to supply a premixed liquid propellant 30 (see FIGS. 1B, 7) under pressure, preferably a high pressure 160 (see FIGS. 4, 5), to the liquid injector system 10 (see FIGS. 1B, 7).

The step 202 (see FIG. 8) of coupling the premixed liquid propellant assembly 40 (see FIGS. 1B, 2A, 2B) preferably further comprises coupling the premixed liquid propellant assembly 40 (see FIGS. 1B, 2A, 2B) comprising a premixed liquid propellant storage tank 42 (see FIGS. 1B, 2A, 2B), a feed valve 44 (see FIGS. 1B, 2A, 2B) for controlling flow of the premixed liquid propellant 30 (see FIGS. 1B, 2A, 2B) into the liquid injector system 10 (see FIG. 1B), and a premixed liquid propellant feed line 46 (see FIGS. 1B, 2A, 2B) connected between the premixed liquid propellant storage tank 42 (see FIGS. 1B, 2A, 2B) and the feed valve 44 (see FIGS. 1B, 2A, 2B).

As shown in FIG. 8, the method 200 further comprises step 204 of coupling a purge gas assembly 54 (see FIGS. 1B, 2A) to the liquid injector system 10 (see FIG. 1B). The purge gas assembly 54 (see FIGS. 1B, 2A) is configured to supply a purge gas 50 (see FIGS. 1B, 2A) under pressure, preferably high pressure, to the liquid injector system 10 (see FIG. 1B).

In one embodiment, the step 204 (see FIG. 8) of coupling the purge gas assembly 54 (see FIGS. 1B, 2A) to the liquid injector system 10 (see FIG. 1B) further comprises coupling the purge gas assembly 54 (see FIGS. 1B, 2A) comprising a purge gas storage tank 56 (see FIGS. 1B, 2A) and a purge gas feed line 58 (see FIGS. 1B, 2A) connected between the purge gas storage tank 56 (see FIGS. 1B, 2A) and the feed valve 44 (see FIGS. 1B, 2A).

In another embodiment, the step 204 (see FIG. 8) of coupling the purge gas assembly 54 (see FIG. 1B) to the liquid injector system 10 (see FIG. 1B) further comprises coupling the purge gas assembly 54, such as in the form of purge gas assembly 54a (see FIG. 2B), comprising a purge gas storage tank 56 (see FIG. 2B); a plurality of valves 62 (see FIG. 2B) comprising at least one purge flow valve 70 (see FIG. 2B), at least one needle valve 72 (see FIG. 2B), and at least one check valve, and preferably two check valves in the form of first check valve 74a (see FIG. 2B), and second check valve 74b (see FIG. 2B); and, a purge gas tap line 64 (see FIG. 2B). The purge gas tap line 64 (see FIG. 2B) connects the purge gas storage tank 56 (see FIG. 2B) and the plurality of valves 62 (see FIG. 2B), and is connected to the single feed inlet 16 (see FIG. 2B) at a location 66 (see FIG. 2B) below the feed valve 44 (see FIG. 2B).

As shown in FIG. 8, the method 200 further comprises step 206 of injecting only the purge gas 50 (see FIGS. 1B, 2A, 2B) into a liquid injector 80 (see FIG. 1B) of the liquid injector system 10 (see FIG. 1B) via a single feed inlet 16 (see FIG. 1B). Step 206 (see FIG. 8) further comprises injecting the purge gas 50 (see FIGS. 1B, 2A, 2B) through one or more injector holes 128 (see FIG. 1B) of the liquid injector 80 (see FIG. 1B) and into a combustion chamber 98 (see FIG. 1B) coupled to the liquid injector 80 (see FIG. 1B).

The step 206 (see FIG. 8) of injecting only the purge gas 50 (see FIGS. 1B, 2A, 2B) preferably further comprises injecting only the purge gas 50 (see FIGS. 1B, 2A, 2B) comprising an inert gas 52 (see FIG. 7). The inert gas 52 (see FIG. 7) preferably includes nitrogen, helium, tridyne, or a combination of two or more thereof.

As shown in FIG. 8, the method 200 further comprises step 208 of injecting only the premixed liquid propellant 30 (see FIGS. 1B, 2A, 2B) into the liquid injector 80 (see FIGS. 1B, 2A, 2B) via the single feed inlet 16 (see FIGS. 1B, 2A, 2B). Step 208 (see FIG. 8) further comprises injecting the premixed liquid propellant 30 (see FIGS. 1B, 2A, 2B) through the one or more injector holes 128 (see FIG. 1B) and into the combustion chamber 98 (see FIG. 1B).

The step 208 (see FIG. 8) of injecting only the premixed liquid propellant 30 (see FIGS. 1B, 2A, 2B) preferably further comprises injecting only the premixed liquid propellant 30 (see FIGS. 1B, 2A, 2B) comprising a mixture 32 (see FIG. 7) of one or more fuels 34 (see FIG. 7) and an oxidizer 36 (see FIG. 7). Preferably, the one or more fuels 34 (see FIG. 7) includes acetylene, ethylene, ethane, methane, or a combination of two or more thereof. Preferably, the oxidizer 36 (see FIG. 7) includes nitrous oxide 38 (see FIG. 7) or liquid oxygen. However, other suitable fuels and oxidizers may be used.

The step 208 (see FIG. 8) of injecting only the premixed liquid propellant 30 (see FIGS. 3A, 3B) may further comprise forming liquid streams 154 (see FIG. 7), such as in the form of impinging liquid streams 154a (see FIG. 3A) or impinging liquid streams 154b (see FIG. 3B), of the premixed liquid propellant 30 (see FIGS. 3A, 3B) exiting the injector outlet side 94b (see FIGS. 3A, 3B) in the liquid phase 144 (see FIGS. 3A, 3B). Step 208 (see FIG. 8) may further comprise breaking up the liquid streams 154 (see FIG. 7), such as in the form of impinging liquid streams 154a (see FIG. 3A) or impinging liquid streams 154b (see FIG. 3B), into vapor droplets 172 (see FIG. 5) in the gas phase 146 (see FIGS. 3A, 3B) to facilitate stability of the flame front 152 (see FIGS. 3A, 3B).

The step 208 (see FIG. 8) of injecting only the premixed liquid propellant 30 (see FIGS. 1B, 3A, 4) further comprises injecting the premixed liquid propellant 30 (see FIGS. 1B, 3A, 4) through the one or more injector holes 128 (see FIGS. 1B, 3A, 4). Each injector hole 128 (see FIGS. 1B, 3A, 4) comprises a channel 134 (see FIGS. 1B, 3A, 4) having sides 136 (see FIGS. 1B, 3A, 4) with one of either a straight configuration 138 (see FIG. 1B), a sloped configuration 140 (see FIG. 3A), or a tapered nozzle configuration 142 (see FIG. 4).

The step 208 (see FIG. 8) of injecting only the premixed liquid propellant 30 (see FIG. 4) further comprises compressing the premixed liquid propellant 30 (see FIG. 4) through the one or more injector holes 128 (see FIG. 4), where the one or more injector holes 128 (see FIG. 4) comprises a channel 134 (see FIG. 4) having an outlet orifice 132b (see FIG. 4) with a smaller diameter than a diameter of an inlet orifice 132a (see FIG. 4).

As shown in FIG. 8, the method 200 further comprises step 210 of creating a pressure gradient decrease 164 (see FIG. 7) between the liquid injector 80 (see FIG. 5) and the combustion chamber 98 (see FIG. 5), and expanding the premixed liquid propellant 30 (see FIG. 5) from a liquid phase 144 (see FIG. 5) into a gas phase 146 (see FIG. 5) at a liquid-to-gas zone 150 (see FIG. 5) between an injector outlet side 94b (see FIG. 5) of the liquid injector 80 (see FIG. 5) and the flame front 152 (see FIG. 5) in the combustion chamber 98 (see FIG. 5). This results in a temperature decrease 168 (see FIG. 7) at the liquid-to-gas zone 150 (see FIG. 5). The pressure gradient decrease 164 (see FIG. 7) and the temperature decrease 168 (see FIG. 7) preferably prevent or mitigate the flame front 152 (see FIG. 5) from propagating upstream of the combustion chamber 98 (see FIG. 5).

As shown in FIG. 8, the method 200 further comprises step 212 of igniting and burning the premixed liquid propellant 30 (see FIGS. 4, 5) in the gas phase 146 (see FIG. 5). As shown in FIG. 8, the method 200 further comprises step 214 of ceasing injection of the premixed liquid propellant 30 (see FIG. 1A) into the liquid injector 80 (see FIG. 1A).

As shown in FIG. 8, the method 200 further comprises step 216 of repeating the step of injecting only the purge gas 50 (see FIGS. 1B, 2A, 2B) into the liquid injector 80 (see FIGS. 1B, 2A, 2B), and removing any premixed liquid propellant 30 (see FIGS. 1B, 2A, 2B) in the liquid injector 80 (see FIGS. 1B, 2A, 2B) and upstream of the liquid injector 80 (see FIGS. 1B, 2A, 2B).

Figure 9:
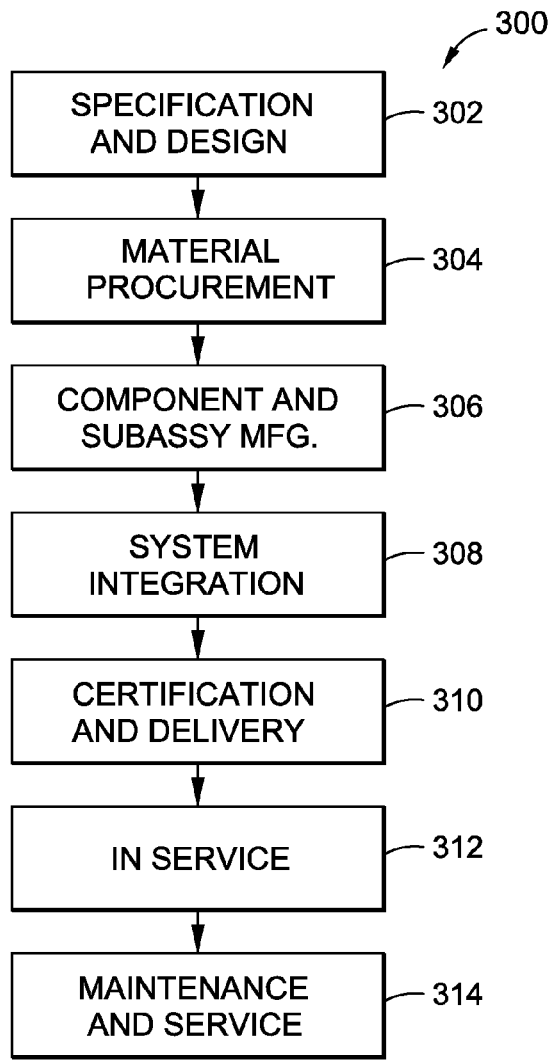
FIG. 9 is an illustration of a flow diagram of an aircraft production and service method; and, FIG. 10 is an illustration of a block diagram of an aircraft.
Figure 10:
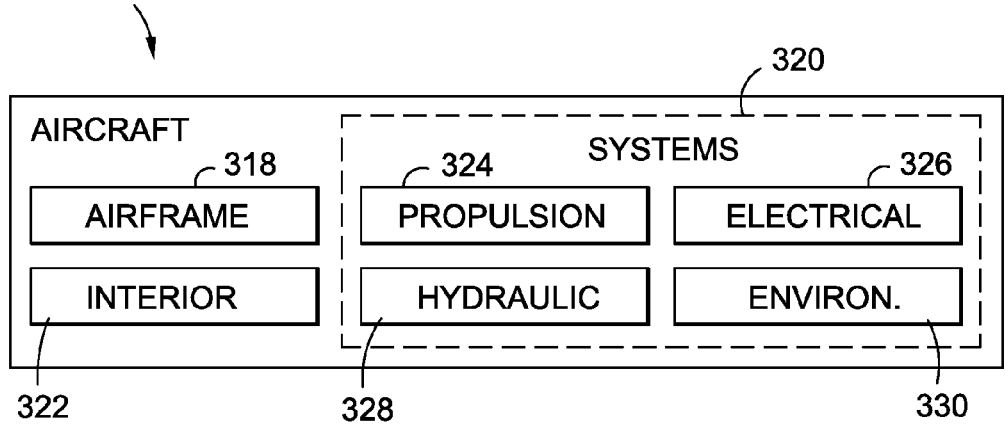

FIG. 9 is an illustration of a flow diagram of an aircraft production and service method 300. FIG. 10 is an illustration of a block diagram of an aircraft 316. Referring to FIGS. 9-10, embodiments of the disclosure may be described in the context of the aircraft production and service method 300, as shown in FIG. 9, and the aircraft 316, as shown in FIG. 10. During pre-production, exemplary aircraft production and service method 300 may include specification and design 302 of the aircraft 316 and material procurement 304. During production, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 which may also include modification, reconfiguration, refurbishment, and other suitable services.

Each of the processes of the aircraft production and service method 300 may be performed or carried out by a system integrator, a third party and/or an operator (e.g., a customer). For the purposes of this description, a system integrator may include without limitation any number of aircraft manufacturers and major-system subcontractors; a third party may include without limitation any number of vendors, subcontractors and suppliers; and, an operator may be an airline, leasing company, military entity, service organization and other suitable operators.

As shown in FIG. 10, the aircraft 316 produced by exemplary aircraft production and service method 300 may include an airframe 318 with a plurality of high-level systems 320 and an interior 322. Examples of the plurality of high-level systems 320 may include one or more of a propulsion system 324, an electrical system 326, a hydraulic system 328, and an environmental system 330. Any number of other systems may also be included. Although an aerospace example is shown, the principles of the invention may be applied to other industries, such as the automotive industry.

Methods and systems embodied herein may be employed during any one or more of the stages of the production and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to routine maintenance and service 314.

Disclosed embodiments of the liquid injector system 10 (see FIGS. 1A-1C, 3A, 4), the premixed liquid propellant propulsion system 14 (see FIGS. 1B, 7), and method 200 (see FIG. 8) provide a high pressure premixed liquid propellant propulsion system to maintain a positive pressure across the entire surface of the liquid injector 80 (see FIG. 5), thus restricting occurrence of flashback 180 (see FIG. 7) and propagation of the flame front 152 (see FIG. 5) upstream of the combustion chamber 98 (see FIG. 5). In addition, disclosed embodiments of the liquid injector system 10 (see FIGS. 1A-1C, 3A, 4), the premixed liquid propellant propulsion system 14 (see FIGS. 1B, 7), and method 200 (see FIG. 8) incorporate into the liquid injector 80 (see FIG. 1B) a purge gas assembly 54 (see FIG. 1B) that uses a purge gas 50 (see FIG. 1B), such as an inert gas 52 (see FIG. 7), to reduce the probability of the occurrence of flashback 180 (see FIG. 7) during shutdown of the engine 12 (see FIG. 1A).

Further, disclosed embodiments of the liquid injector system 10 (see FIGS. 1A-1C, 3A, 4), the premixed liquid propellant propulsion system 14 (see FIGS. 1B, 7), and method 200 (see FIG. 8) combine one or more fuels 34 (see FIG. 7) and an oxidizer 36 (see FIG. 7) into a single tank which reduces overall part count and simplifies the system design. The ability to use disclosed embodiments of the liquid injector system 10 (see FIGS. 1A-1C, 3A, 4), the premixed liquid propellant propulsion system 14 (see FIGS. 1B, 7), and method 200 (see FIG. 8) requires a feed system that can mitigate or prevent the flame front 152 (see FIG. 5) from propagating upstream of the combustion chamber 98 (see FIG. 5). The liquid injector 80 (see FIGS. 1A-1C, 3A, 4) uses a liquid phase 144 (see FIG. 1A) and a gas phase 146 (see FIG. 1A) in a liquid-to-gas zone 150 (see FIG. 1A) to mitigate or prevent flashback 180 (see FIG. 7) of the flame front 152 (see FIG. 1A), and the anti-flashback quenching liquid injector design 178 (see FIG. 1A) takes advantage of the naturally quenching nature of the liquid-to-gas phase transition, especially the value of chilled liquid nitrous oxide fuel blends (NOFB). The liquid injector 80 (see FIGS. 4, 5) acts as an atomizer and runs the premixed liquid propellant 30 (see FIGS. 4, 5) under high pressure 160 (see FIGS. 4, 5) and high velocity into a lower pressure combustion chamber 98 (see FIGS. 4, 5). The result is a pressure drop 162 (see FIGS. 4, 5) causing atomization into extremely small vapor droplets 172 (see FIG. 5) which provide a large surface for rapid vaporization and an expected controlled burn in the ignition and burn zone 170 (see FIG. 4). By mitigating or preventing flashback 180 (see FIG. 7) or flame deflagration, the total system production and operating costs may be decreased and operational flexibility and responsiveness may be improved.

Moreover, disclosed embodiments of the liquid injector system 10 (see FIGS. 1A-1C, 3A, 4), the premixed liquid propellant propulsion system 14 (see FIGS. 1B, 7), and method 200 (see FIG. 8) provide a low cost, lightweight premixed liquid propellant propulsion system 14 (see FIGS. 1B, 7) to support, for example, orbital delivery of small satellites. Utilizing the premixed liquid propellant propulsion system 14 (see FIGS. 1B, 7) may increase the overall performance of a rocket's 118 (see FIGS. 6, 7) weight, while reducing system complexity, part count, and operational expenses. Further advantages of the disclosed embodiments of the liquid injector system 10 (see FIGS. 1A-1C, 3A, 4), the premixed liquid propellant propulsion system 14 (see FIGS. 1B, 7), and method 200 (see FIG. 8) may include reduction in the size of an air vehicle 112 (see FIG. 7), such as a rocket 118 (see FIG. 7), which may simplify handling, transport and support cost; simplification of the propulsion system design which may increase the probability of launch success; reduction in part count which may translate into lower production, integration and test costs; design of a lower mass rocket 118 (see FIG. 7), for example, a fraction rocket launcher, for comparable performance; production of an operationally and industrially manageable safety margin for use; and, enablement of a larger thrust class engine (higher mass flow through the engine).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A liquid injector system for a combustion engine, the liquid injector system comprising:
   a single feed inlet configured to receive a premixed liquid propellant under pressure or a purge gas under pressure;
   a liquid injector assembly coupled to the single feed inlet, the liquid injector assembly comprising:
      a liquid injector having one or more injector holes configured to receive and to initially inject only the purge gas through the liquid injector and into a combustion chamber coupled to the liquid injector, the purge gas injected under a high pressure in a range of from about 500 psi (pounds per square inch) to about 1700 psi to pressurize an injector inlet side of the liquid injector, and after injection of the purge gas, the one or more injector holes configured to receive and to inject only the premixed liquid propellant through the liquid injector and into the combustion chamber, the premixed liquid propellant injected under a high pressure in a range of from about 500 psi to about 1700 psi to maintain a positive pressure across the liquid injector and to pressurize the injector inlet side, the combustion chamber having a decreased pressure in a range of from about 300 psi to about 1500; and,
      a hollow dome coupled to the single feed inlet and coupled over the injector inlet side of the liquid injector; and,
   a liquid-to-gas zone between an injector outlet side of the liquid injector and a flame front in the combustion chamber of the combustion engine, wherein a pressure gradient decrease between the liquid injector and the combustion chamber causes the premixed liquid propellant to expand from a liquid phase into a gas phase, which causes a temperature decrease at the liquid-to-gas zone, wherein the pressure gradient decrease and temperature decrease prevent or mitigate the flame front from propagating upstream of the combustion chamber, which achieves an anti-flashback quenching liquid injector design.

2. The liquid injector system of claim 1 wherein the premixed liquid propellant comprises a mixture of one or more fuels and an oxidizer.

3. The liquid injector system of claim 2 wherein the one or more fuels is selected from the group consisting of acetylene, ethylene, ethane, methane, and a combination of two or more thereof.

4. The liquid injector system of claim 2 wherein the oxidizer is selected from the group consisting of nitrous oxide and liquid oxygen.

5. The liquid injector system of claim 1 wherein the purge gas is an inert gas selected from the group consisting of nitrogen, helium, tridyne, and a combination of two or more thereof.

6. The liquid injector system of claim 1 wherein the one or more injector holes each comprises a channel having sides with a straight configuration perpendicular to both the injector inlet side and the injector outlet side of the liquid injector.

7. The liquid injector system of claim 1 wherein the liquid injector system is a rocket liquid injector system, and the combustion engine is a rocket combustion engine.

8. The liquid injector system of claim 1 wherein the liquid injector is a multiple injector hole liquid injector.

9. A premixed liquid propellant propulsion system, comprising:

a combustion engine comprising a liquid injector system coupled to a combustion chamber, the liquid injector system comprising:
  a single feed inlet configured to receive a premixed liquid propellant under pressure or a purge gas under pressure, wherein the premixed liquid propellant comprises a mixture of one or more fuels and an oxidizer, and further wherein the purge gas comprises an inert gas;
  a liquid injector assembly coupled to the single feed inlet, the liquid injector assembly comprising:
    a liquid injector having one or more injector holes configured to receive and to initially inject only the purge gas through the liquid injector and into the combustion chamber coupled to the liquid injector, the purge gas injected under a high pressure in a range of from about 500 psi (pounds per square inch) to about 1700 psi to pressurize an injector inlet side of the liquid injector, and after injection of the purge gas, the one or more injector holes configured to receive and to inject only the premixed liquid propellant through the liquid injector and into the combustion chamber, the premixed liquid propellant injected under a high pressure in a range of from about 500 psi to about 1700 psi to maintain a positive pressure across the liquid injector and to pressurize the injector inlet side, the combustion chamber having a decreased pressure in a range of from about 300 psi to about 1500 psi; and,
    a hollow dome coupled to the single feed inlet and coupled over the injector inlet side of the liquid injector;
  a liquid-to-gas zone between an injector outlet side of the liquid injector and a flame front in the combustion chamber, wherein a pressure gradient decrease between the liquid injector and the combustion chamber causes the premixed liquid propellant to expand from a liquid phase into a gas phase, which causes a temperature decrease at the liquid-to-gas zone, wherein the pressure gradient decrease and the temperature decrease prevent or mitigate the flame front from propagating upstream of the combustion chamber, which achieves an anti-flashback quenching liquid injector design;
  a premixed liquid propellant assembly coupled to the single feed inlet of the liquid injector system, the premixed liquid propellant assembly supplying the premixed liquid propellant under pressure to the liquid injector system; and,
  a purge gas assembly coupled to the single feed inlet of the liquid injector system, the purge gas assembly supplying the purge gas under pressure to the liquid injector system.

10. The premixed liquid propellant propulsion system of claim 9 wherein the fuel is selected from the group consisting of acetylene, ethylene, ethane, methane, and a combination of two or more thereof.

11. The premixed liquid propellant propulsion system of claim 9 wherein the oxidizer is selected from the group consisting of nitrous oxide and liquid oxygen.

12. The premixed liquid propellant propulsion system of claim 9 wherein the inert gas is selected from the group consisting of nitrogen, helium, tridyne, and a combination of two or more thereof.

13. The premixed liquid propellant propulsion system of claim 9 wherein the one or more injector holes each comprises a channel having sides with one of a straight configuration, a sloped configuration, or a tapered nozzle configuration.

14. The premixed liquid propellant propulsion system of claim 9 wherein the premixed liquid propellant propulsion system is a rocket premixed liquid propellant propulsion system, and the combustion engine is a rocket combustion engine.

15. The premixed liquid propellant propulsion system of claim 9 wherein the premixed liquid propellant assembly comprises a premixed liquid propellant storage tank, a feed valve coupled to the single feed inlet for controlling flow of the premixed liquid propellant into the liquid injector system, and a premixed liquid propellant feed line connected between the premixed liquid propellant storage tank and the feed valve.

16. The premixed liquid propellant propulsion system of claim 15 wherein the purge gas assembly comprises a purge gas storage tank and a purge gas feed line connected between the purge gas storage tank and the feed valve coupled to the single feed inlet.

17. A method of operating a premixed liquid propellant propulsion system, the method comprising the steps of:
  coupling a premixed liquid propellant assembly to a liquid injector system of the premixed liquid propellant propulsion system, the premixed liquid propellant assembly configured to supply a premixed liquid propellant under pressure to the liquid injector system;
  coupling a purge gas assembly to the liquid injector system, the purge gas assembly configured to supply a purge gas under pressure to the liquid injector system;
  injecting initially only the purge gas into a liquid injector of the liquid injector system via a single feed inlet, and injecting the purge gas through one or more injector holes of the liquid injector and into a combustion chamber coupled to the liquid injector, and injecting the purge gas under a high pressure in a range of from about 500 psi (pounds per square inch) to about 1700 psi to pressurize an injector inlet side of the liquid injector;
  after injecting the purge gas, injecting only the premixed liquid propellant into the liquid injector via the single feed inlet, and injecting the premixed liquid propellant through the one or more injector holes and into the combustion chamber, and injecting the premixed liquid propellant under a high pressure in a range of from about 500 psi to about 1700 psi to maintain a positive pressure across the liquid injector and to pressurize the injector inlet side of the liquid injector;
  creating a pressure gradient decrease between the liquid injector and the combustion chamber, and expanding the premixed liquid propellant from a liquid phase into a gas phase at a liquid-to-gas zone between an injector outlet side of the liquid injector and a flame front in the combustion chamber, resulting in a temperature decrease at the liquid-to-gas zone, wherein the pressure gradient decrease and the temperature decrease prevent or mitigate the flame front from propagating upstream of the combustion chamber, the combustion chamber having a decreased pressure in a range of from about 300 psi to about 1500 psi;
  igniting and burning the premixed liquid propellant in the gas phase;
  ceasing injection of the premixed liquid propellant into the liquid injector; and, repeating the step of injecting only the purge gas into the liquid injector, and removing any premixed liquid propellant in the liquid injector and upstream of the liquid injector.

18. The method of claim 17 wherein the step of coupling the premixed liquid propellant assembly further comprises coupling the premixed liquid propellant assembly comprising a premixed liquid propellant storage tank, a feed valve for controlling flow of the premixed liquid propellant into the liquid injector system, and a premixed liquid propellant feed line connected between the premixed liquid propellant storage tank and the feed valve.

19. The method of claim 18 wherein the step of coupling the purge gas assembly to the liquid injector system further comprises coupling the purge gas assembly comprising a purge gas storage tank and a purge gas feed line connected between the purge gas storage tank and the feed valve.

20. The method of claim 17 wherein the step of injecting only the purge gas further comprises injecting only the purge gas comprising an inert gas selected from the group consisting of nitrogen, helium, tridyne, and a combination of two or more thereof.

21. The method of claim 17 wherein the step of injecting only the premixed liquid propellant further comprises injecting only the premixed liquid propellant comprising a mixture of one or more fuels and an oxidizer, wherein the one or more fuels is selected from the group consisting of acetylene, ethylene, ethane, methane, and a combination of two or more thereof, and wherein the oxidizer is selected from the group consisting of nitrous oxide and liquid oxygen.

22. The method of claim 17 wherein the step of injecting only the premixed liquid propellant further comprises injecting the premixed liquid propellant through the one or more injector holes, each injector hole comprising a channel having sides with one of a straight configuration, a sloped configuration, or a tapered nozzle configuration.

23. The method of claim 17 wherein the method of operating the premixed liquid propellant propulsion system comprises operating a rocket premixed liquid propellant propulsion system.

* * * * *